United States Patent
Yoo

(10) Patent No.: US 12,203,770 B1
(45) Date of Patent: *Jan. 21, 2025

(54) SYSTEM AND METHOD FOR HAPTIC NAVIGATION

(71) Applicant: WearWorks, Inc, Brooklyn, NY (US)

(72) Inventor: Kevin Yoo, Brooklyn, NY (US)

(73) Assignee: WearWorks, Inc

(*) Notice: Subject to any disclaimer, the term of this patent is extended or adjusted under 35 U.S.C. 154(b) by 0 days.

This patent is subject to a terminal disclaimer.

(21) Appl. No.: 18/674,965

(22) Filed: May 27, 2024

Related U.S. Application Data

(63) Continuation of application No. 18/418,549, filed on Jan. 22, 2024.

(51) Int. Cl.
| | | |
|---|---|---|
| *G08B 6/00* | (2006.01) | |
| *G01B 7/30* | (2006.01) | |
| *G01C 21/36* | (2006.01) | |
| *G06F 3/01* | (2006.01) | |

(52) U.S. Cl.
CPC .......... *G01C 21/3652* (2013.01); *G01B 7/30* (2013.01); *G06F 3/016* (2013.01); *G08B 6/00* (2013.01)

(58) Field of Classification Search
CPC ........ G01C 21/3652; G06F 3/016; G08B 6/00
See application file for complete search history.

(56) References Cited

U.S. PATENT DOCUMENTS

| | | | |
|---|---|---|---|
| 6,320,496 B1 * | 11/2001 | Sokoler | G01C 21/20 340/407.1 |
| 2016/0267755 A1 * | 9/2016 | Martinson | G08B 6/00 |

* cited by examiner

*Primary Examiner* — Hongmin Fan
(74) *Attorney, Agent, or Firm* — Gearhart Law, LLC

(57) ABSTRACT

A haptic navigation system is disclosed, comprising a haptic navigation device with one or more sensors, including an angular sensor, to detect the angle between the device's orientation and a target. The system also includes a vibration motor that generates haptic feedback based on mapped patterns derived from the device's orientation relative to the target. A central processing unit (CPU) interprets the angular data from the sensor, translates it into dynamic haptic patterns, and controls the vibration motor accordingly. The system further includes a memory to store the mapping of the dynamic haptic patterns and a graphic user interface (GUI) to interact with the haptic feedback. This haptic navigation system provides users with tactile guidance and enhances their interaction with electronic devices.

20 Claims, 39 Drawing Sheets

3600

SYSTEM AND METHOD FOR HAPTIC NAVIGATION

CROSS-REFERENCE TO RELATED APPLICATIONS

The present application is a US Continuation and claims priority under 35 USC 119 (e) from U.S. Non-Provisional application Ser. No. 18/418,549 filed on Jan. 22, 2024, the entire contents of which are incorporated by reference.

FIELD OF THE INVENTION

This invention relates to systems and methods for creating a Haptic Line™. In particular, this invention relates to the drawing of the Haptic Line™ on a computing device, converting the Haptic Line™ into a haptic file format, playing back the Haptic Line™ over a user-specified duration in vibrations that the user can feel from the computing device, and transmitting the customized Haptic Line™ to a database, another computing device, or another user.

BACKGROUND OF THE EMBODIMENTS

Haptic technology, also known as kinesthetic communication or 3D touch, refers to any technology that can create an experience of touch by applying forces, vibrations, or motions to the user. These technologies can be used to create virtual objects in a computer simulation, to control virtual objects, and to enhance remote control of machines and devices. Haptic devices may incorporate haptic sensors that measure forces exerted by the user on the interface.

However, creating haptics is a challenge. The process involves technical knowledge of hardware (vibrating motors and drivers), mathematics, software and firmware. Further, haptics are often identical and fail to allow for user-customizability. The instant invention provides both systems and methods for creating user-specified Haptic Lines™.

Previous approaches to haptic navigation systems have focused on utilizing various sensors and actuators to provide tactile feedback to users. These systems typically involve the use of accelerometers or gyroscopes to detect the orientation of a haptic navigation device and generate corresponding haptic patterns. However, these approaches often lack the ability to accurately interpret and map the angular data obtained from the sensors to generate dynamic haptic patterns.

Some existing haptic navigation systems employ vibration motors to generate haptic feedback based on predefined patterns. These patterns are typically static and do not adapt to the specific orientation of the haptic navigation device relative to the target. As a result, the haptic feedback provided by these systems may not effectively convey the desired information to the user.

Other approaches have attempted to address the limitations of static haptic patterns by incorporating more complex algorithms and mapping techniques. These systems aim to generate dynamic haptic patterns based on the orientation of the haptic navigation device. However, these approaches often require significant computational resources and may suffer from latency issues, resulting in a delay between the detection of the orientation and the generation of the corresponding haptic feedback. Previous approaches to haptic navigation systems have made use of sensors and actuators to provide tactile feedback to users. However, these approaches have not been able to accurately interpret and map angular data to generate dynamic haptic patterns that effectively convey information to the user. Additionally, existing systems may suffer from limitations such as static haptic patterns or latency issues. Therefore, there is a need for an improved haptic navigation system that overcomes these limitations and provides a more intuitive and responsive user experience.

SUMMARY OF THE EMBODIMENTS

The present invention and its embodiments relate to systems and methods for creating a Haptic Line™. In particular, this invention relates to the drawing of the Haptic Line™ on a computing device, converting the Haptic Line™ into a haptic file format, playing back the Haptic Line™ over a user-specified duration in vibrations that the user can feel from the computing device, and transmitting the customized Haptic Line™ to a database, another computing device, or a user.

Specifically, the present invention provides a computing device that includes, at least, a graphical user interface (GUI) and a Haptic Line™ engine. The GUI is configured to receive a login input (e.g., an email address and a password or a biometric login input) from a user to access a haptic creative studio. The Haptic Line™ engine includes at least one algorithm. The Haptic Line™ engine is configured to verify an identity of the user from the login input and provide the user access to the haptic creative studio such that the user is permitted to create, save, and share a Haptic Line™.

In some examples, the Haptic Line™ engine is further configured to: share the Haptic Line™ with at least one of another computing device and another user. Such sharing may occur via a messaging method (such as SMS messaging and/or email messaging). In other examples, the Haptic Line™ engine is further configured to, in response to a prompt from the user, assign the haptic Line™ to a contact or a notification on the computing device. For example, the notification may be an alarm, a calendar event, and/or a reminder.

In additional examples, the haptic creative studio comprises at least a grouping of default haptics, a grouping of user-created haptics, an option to search for new haptics, and an option to create and sort through haptic pattern collections. The Haptic Line™ engine is further configured to display information associated with the Haptic Line™ via the GUI. The information may include: a name of the user who created the Haptic Line™, a title of the Haptic Line™, an image associated with the Haptic Line™, a color associated with the Haptic Line™, and/or a quantity of likes of the Haptic Line™ from other users.

In some examples, to create the Haptic Line™, the Haptic Line™ engine is further configured to: allow the user to drag a finger on the GUI to increase or decrease an intensity of the Haptic Line™ and/or increase or decrease a length of the Haptic Line™ when the computing device is in a portrait mode or in a landscape mode. In other examples, to create the Haptic Line™, the Haptic Line™ engine is further configured to allow the user to customize a sharpness or softness ratio applied over the Haptic Line™ when the computing device is in a portrait mode or in a landscape mode.

In additional examples, the Haptic Line™ engine is further configured to, in response to a prompt from the user, save the haptic Line™ to an external database or server. The Haptic Line™ engine is further configured to, in response to a prompt from the user, provide one or more other users public access to the Haptic Line™.

Further, in some examples, the Haptic Line™ engine is further configured to, in response to a prompt from the user, group multiple Haptic Lines™ together to create a Compound Haptic Line™. Further, the Haptic Line™ engine is configured to convert the Haptic Line™ into a haptic file format and play back the Haptic Line™ over a user-specified duration in vibrations that the user can feel from the computing device.

A wearable haptic navigation system serves as a fully functional and cost-efficient prototype of a wearable device designed for touch-based navigation. It operates without a visual display, relying solely on touch for information transmission. Functioning as both a compass directing users to the North and a GPS navigator guiding towards specific landmarks like home, the device allows users to perceive the distance from their designated locations. Its Bluetooth interface facilitates network connectivity, enabling the download of map landmarks from a cell phone. Moreover, the bidirectional networking feature enables the device to collect various sensor data, deliver haptic messages, and offer touch telepresence capabilities.

A haptic navigation system and method for delivering haptic spatial information is based on exploiting the human haptic perception system's ability to interpret sensations, providing comprehensive detail. A GPS, 3-axis compass, inertial sensor, power management, battery, and embedded processor is incorporated within a compact and cost-effective package. In an embodiment, haptic navigation system is comprised of various components, including a digital compass, accelerometer, GPS positioning unit, Bluetooth communications module, memory card, integrated rechargeable battery system, USB connectivity for firmware and user data updates, and an optional character display. The accelerometer serves to offer tilt compensation to the compass and may recognize environmental attributes by detecting specific signals in the data that indicate the necessary movement to navigate around obstacles. Furthermore, there is an option to incorporate a camera system as an additional feature.

Initially developed as a navigation aid for the visually impaired, our system targets multiple markets, including assistive technologies for individuals with severe or partial visual impairments, dementia (with an estimated global market of 18 million), and applications in the military, tourism, hiking, and search and rescue.

The system's physical components include four vibro-haptic motors for directional guidance, one distal motor for distance indication, and a controller comprising a power management system, battery, GPS receiver, 3-axis accelerometer, digital compass (magnetometer), Bluetooth transmitter/receiver, and potentially a vision system in the future. To ensure optimal performance, a wearable medium like neoprene facilitates vertical conduction of motor vibrations to the skin, minimizing lateral energy transfer.

Using the Bluetooth wireless interface, the system processes single or multiple landmarks received in a sequential order, removing processed landmark information once the user reaches the designated vicinity and labeling the subsequent one as the current landmark.

Beyond the specifics outlined, the system's versatility allows for alternative forms beyond a belt, offering a continuum of orientations around various body parts. The device's size is primarily constrained by its electronic components, while communication methods can include RF, Bluetooth, or infrared. Storing maps and databases on separate devices like cell phones or iPods is recommended.

In summary, while our description provides specific details, they are illustrative rather than restrictive. The invention's scope should be determined by the appended claims and their legal equivalents, without being confined by the embodiments described.

DESCRIPTION OF THE PREFERRED EMBODIMENTS

Figure 1:
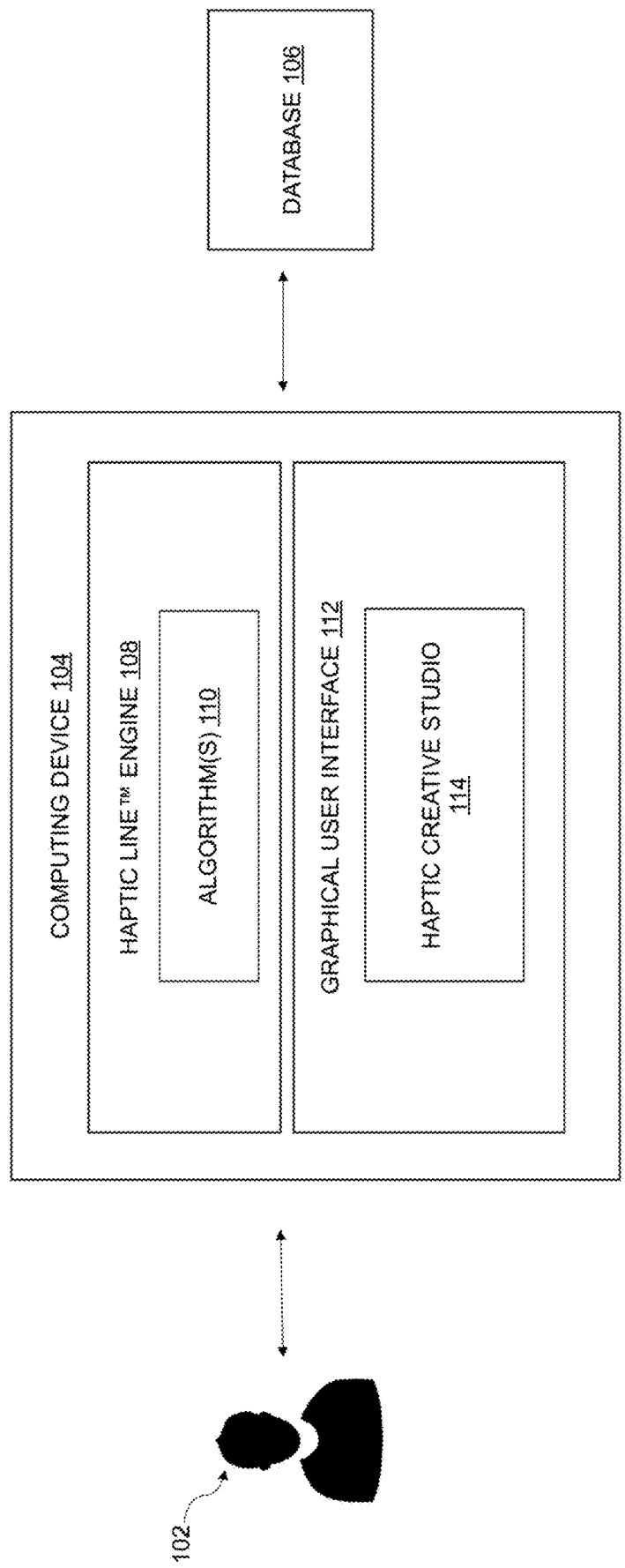
FIG. 1 depicts a schematic diagram of a computer system, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the term "haptics" refers to the perception of objects by touch, like the vibrations in a mobile device.

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by an "engine" or processor. Thus, the methods and systems of the present invention may be performed by a computer or computing device having a processor based on instructions received by computer applications and software.

The term "haptic navigation device," "electronic device," "mobile device," or "client device," as used herein is a type of computer comprising circuitry and configured to generally perform functions such as recording audio, photos, videos and handwritten notes; displaying or reproducing audio, photos, videos and handwritten notes; storing, retrieving, or manipulation of electronic data; providing electrical communications and network connectivity; or any other similar function. Non-limiting examples of electronic devices include: personal computers (PCs), workstations, laptops, tablet PCs, cell phones, digital music players, digital notepads, digital pens or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as smartwatches, fitness rings, fitness trackers, etc.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (e.g., a "wireless network") which may include WIFI and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigby network, or a voice-over-IP (VOIP) network.

As used herein, the term "database" or "DB" shall generally mean a digital collection of data or information. A database may be stored on a remote server and accessed by a client device through the Internet (e.g., the database is in the cloud) or alternatively in some embodiments the database may be stored on the client device or remote computer itself (e.g., local storage). A "data store" as used herein may contain or comprise a database (e.g., information and data from a database may be recorded into a medium on a data store).

A computer system configured to implement a method for providing a Haptic Line™ is depicted in FIG. 1. Specifically, the instant system allows users to create and customize haptic vibrational patterns or select from a default library, as well as share the customized haptic vibrational patterns with friends and family. The computer system of FIG. 1 includes a computing device 104 associated with a user 102. The computer system of FIG. 1 may also include a database 106 that houses data and information described herein. The computing device 104 may access the database 106 via a network.

The computing device 104 of FIG. 1 may comprise a Haptic Line™ engine 108 that may execute the method described herein. In other examples, the Haptic Line™ engine 108 of FIG. 1 may be an application, a software program, a service, or a software platform configured to be executable on the computing device 104. Furthermore, the Haptic Line™ engine 108 may comprise one more algorithms 110 that assist in the process steps executed by the Haptic Line™ engine 108.

The computing device 104 may also comprise one or more processors, one or more memories, and one or more computer-readable hardware storage devices, which will be described further herein with regards to FIG. 35. The one or more computer-readable hardware storage devices contain program code executable by the one or more processors via the one or more memories to implement the method process steps described herein. Further, the computing device 104 may comprise a graphical user interface (GUI) 112. The user 102 may interact with a haptic creative studio 114 via the GUI 112.

For example, the user 102 may interact with the haptic creative studio 114 to create, save, and share haptics (e.g., Haptic Lines™) or Haptic Line™ collections with others. Specifically, the user 102 may interact with the haptic creative studio 114 to easily draw, save, and edit the Haptic Lines™. The user 102 may then engage the haptic creative studio 114 to assign the Haptic Lines™ created to notifications (e.g., calendar alerts, reminders, etc.) on the computing device 104.

Figure 2:
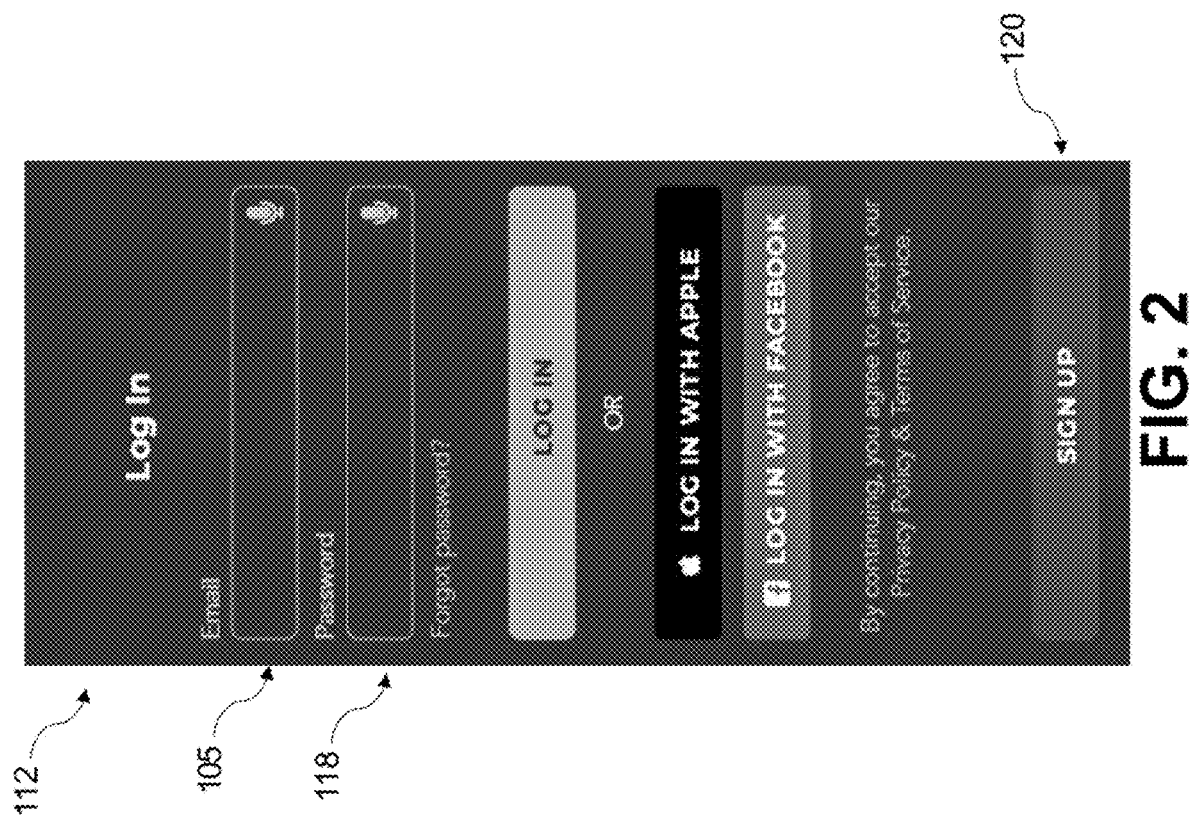
FIG. 2 depicts a schematic diagram of a login screen for a user to access a haptic creative studio, in accordance with embodiments of the present invention.

When the user 102 engages the haptic creative studio 114, the user 102 may be prompted to login using an email address 105 and a password 118 or may be prompted to sign up 120 to utilize the service, as shown in FIG. 2. In some examples, other means to verify an identity of the user 102 may be used, such as biometric identification methods (e.g., fingerprint identification, face recognition identification, palm print identification, iris recognition, retina recognition, etc.).

Figure 3:
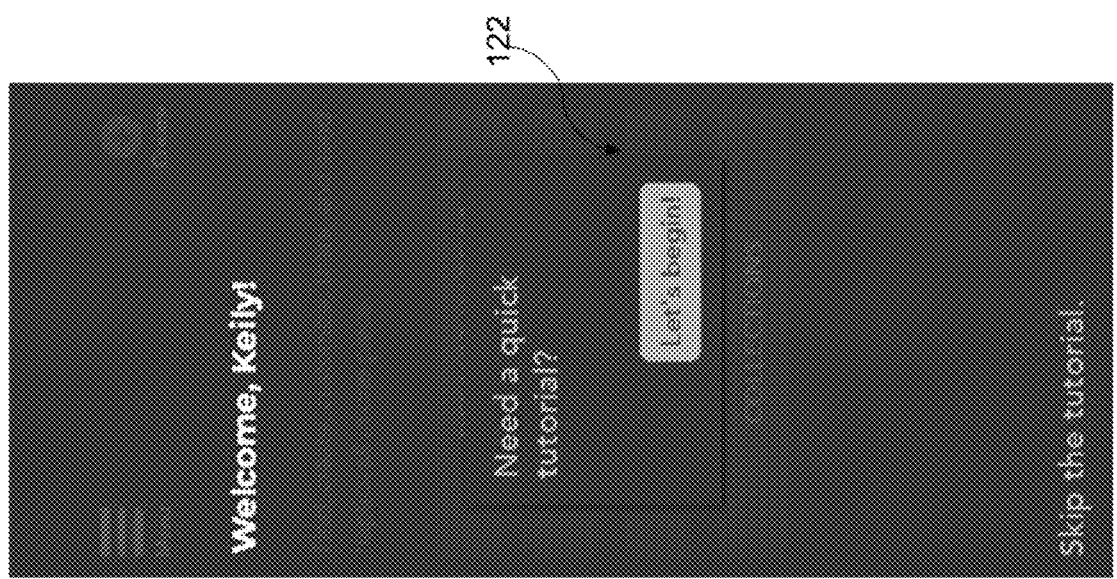
FIG. 3 depicts schematic diagrams of tutorial screens associated with a haptic creative studio, in accordance with embodiments of the present invention.
Figure 4:
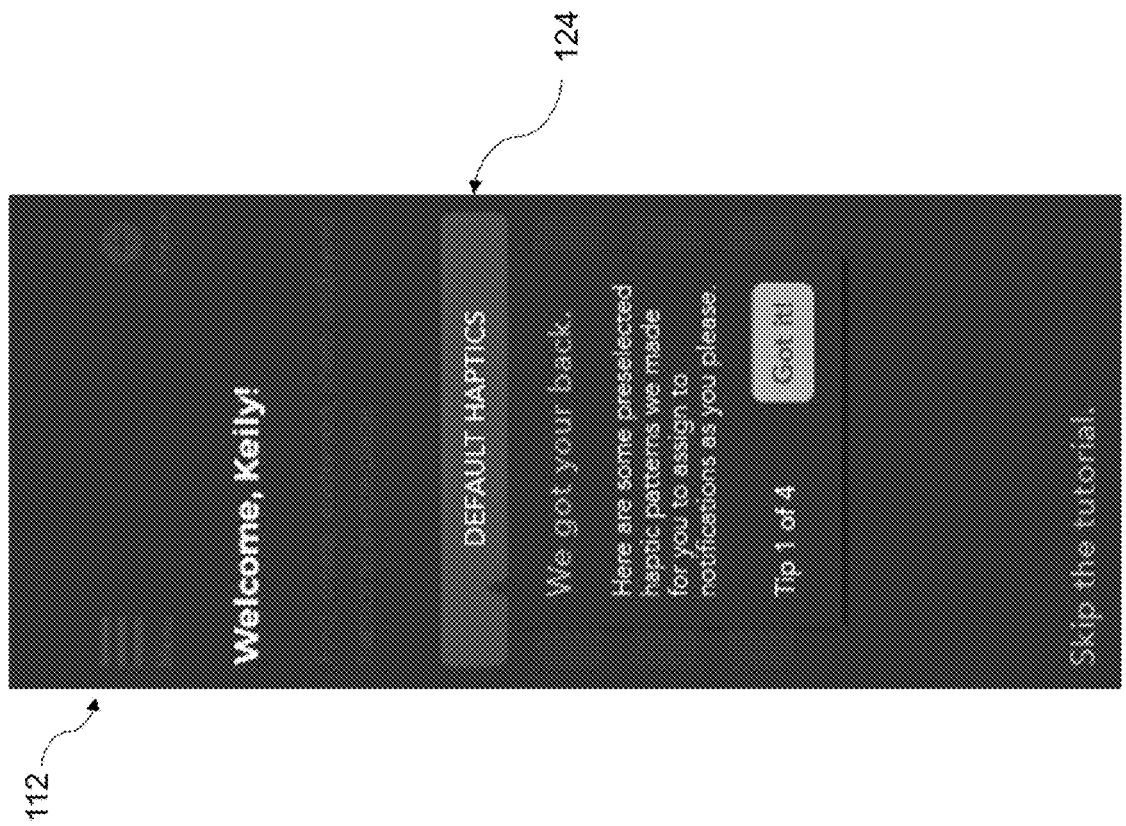
FIG. 4 depicts schematic diagrams of tutorial screens associated with a haptic creative studio, in accordance with embodiments of the present invention.
Figure 5:
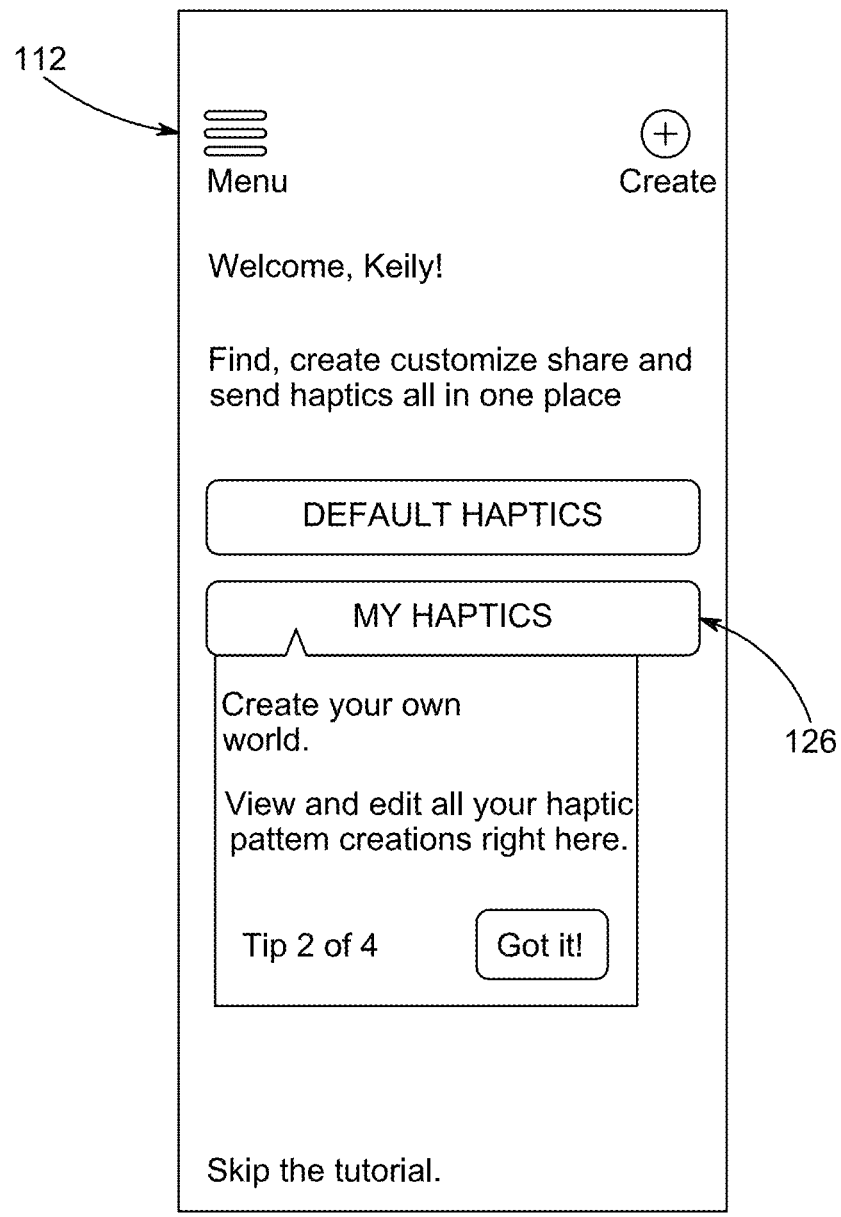
FIG. 5 depicts schematic diagrams of tutorial screens associated with a haptic creative studio, in accordance with embodiments of the present invention.
Figure 6:
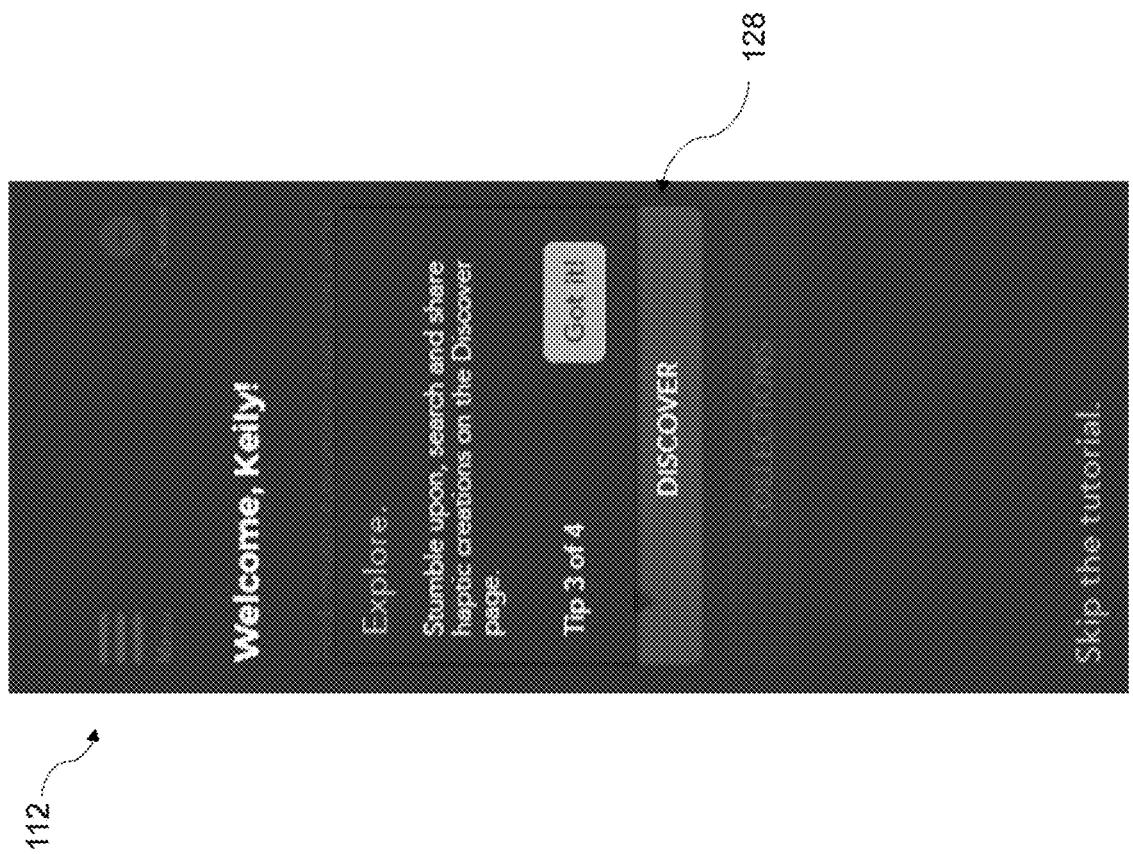
FIG. 6 depicts schematic diagrams of tutorial screens associated with a haptic creative studio, in accordance with embodiments of the present invention.
Figure 7:
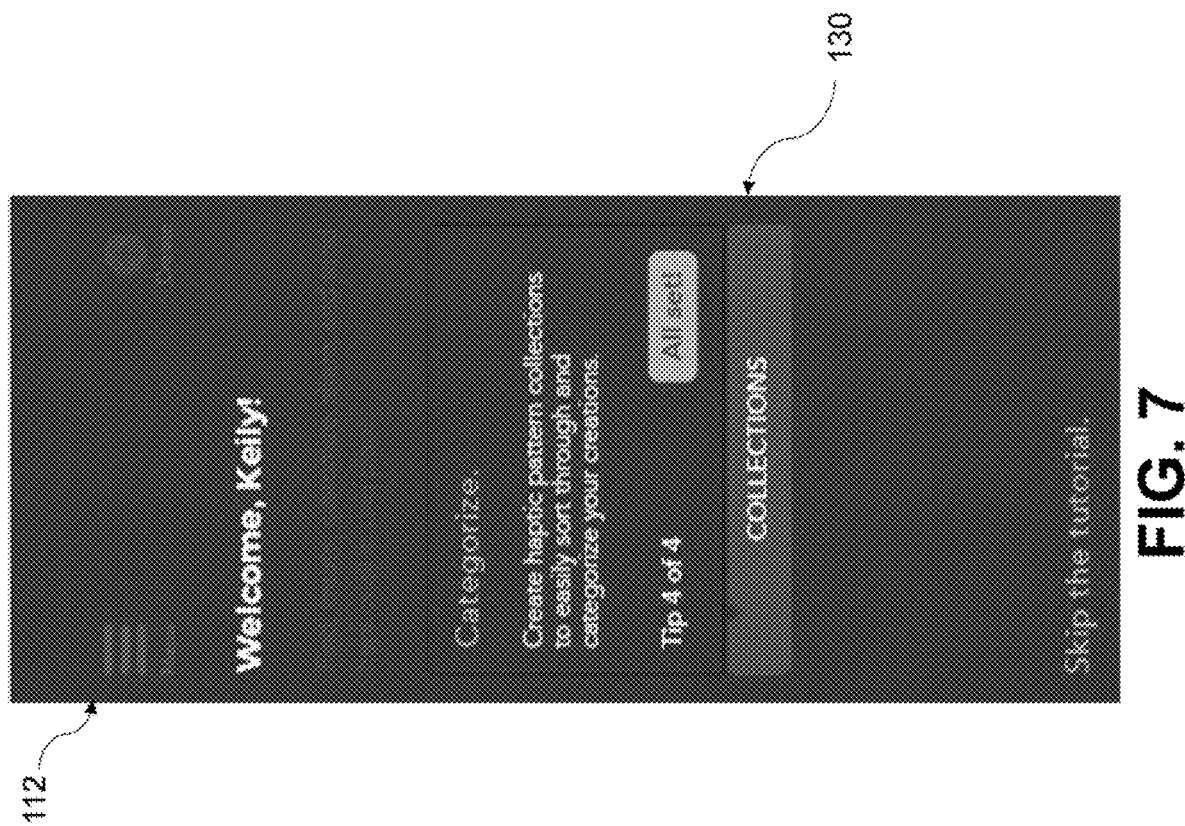
FIG. 7 depicts schematic diagrams of tutorial screens associated with a haptic creative studio, in accordance with embodiments of the present invention.
Figure 8:
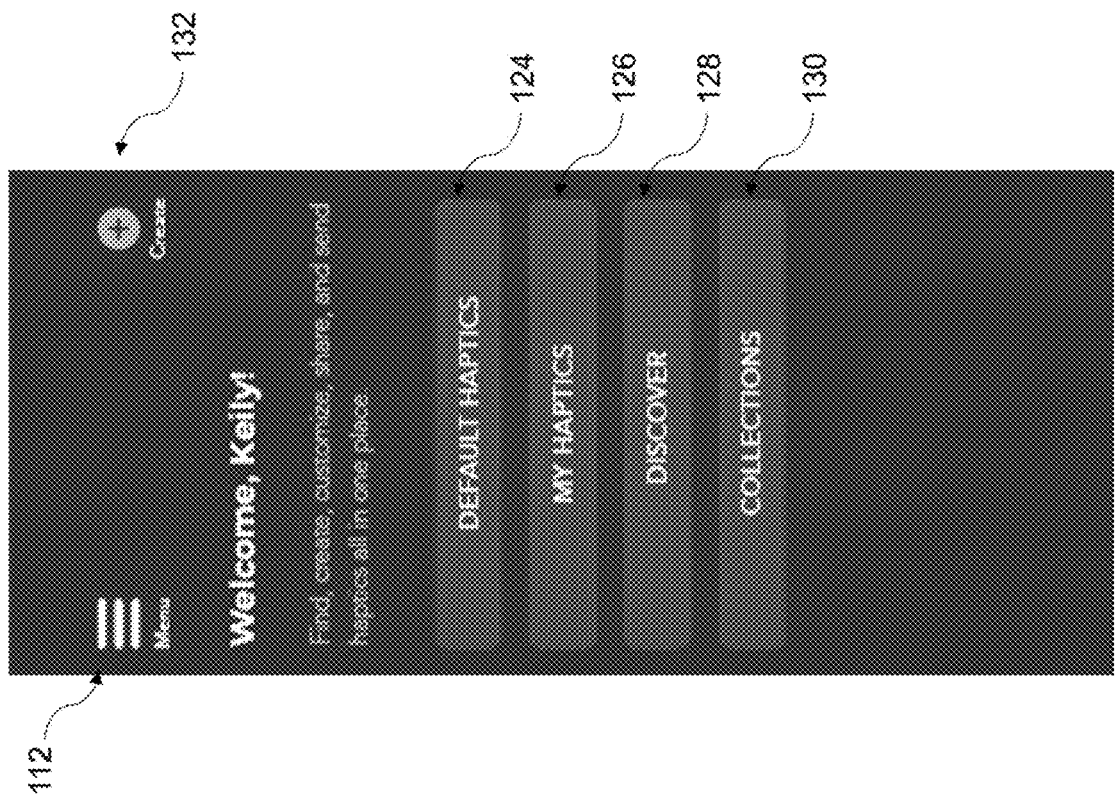
FIG. 8 depicts a schematic diagram of a home screen associated with a haptic creative studio, in accordance with embodiments of the present invention.
Figure 9:
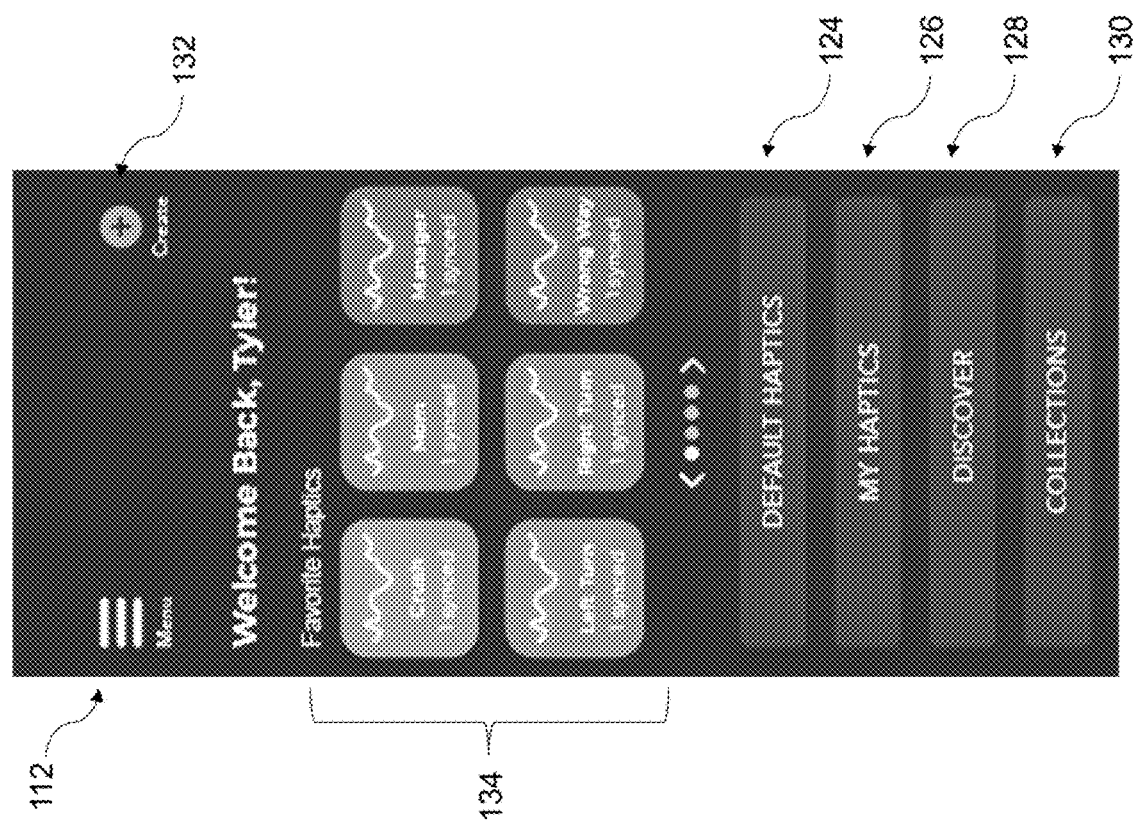
FIG. 9 depicts a schematic diagram of a screen associated with "favorite" Haptic Lines™ in a haptic creative studio, in accordance with embodiments of the present invention.

Once the Haptic Line™ engine 108 verifies an identity of the user 102, the user 102 may be directed to a welcome or home screen, as shown in FIG. 3. The welcome or home screen of FIG. 3 may provide the user 102 with a tutorial 122 for the haptic creative studio 114. The user 102 has the option to view or to skip the tutorial 122. The tutorial 122 for the haptic creative studio 114 may include: a grouping of default or preselected haptics 124 (of FIG. 4), a grouping of user-created haptics (e.g., "My Haptics") 126 (of FIG. 5), an option to search for new haptics 128 (of FIG. 6), and an option to create and sort through haptic pattern collections 130 (of FIG. 7). FIG. 8 and FIG. 9 depict the options discussed in FIG. 4, FIG. 5, FIG. 6, and FIG. 7, as well as a creation action button 132 for the user 102 to create a new Haptic Line™ in the haptic creative studio 114. Moreover, FIG. 9 depicts a grouping of "Favorite Haptics" 134 of a given user 102.

Figure 10:
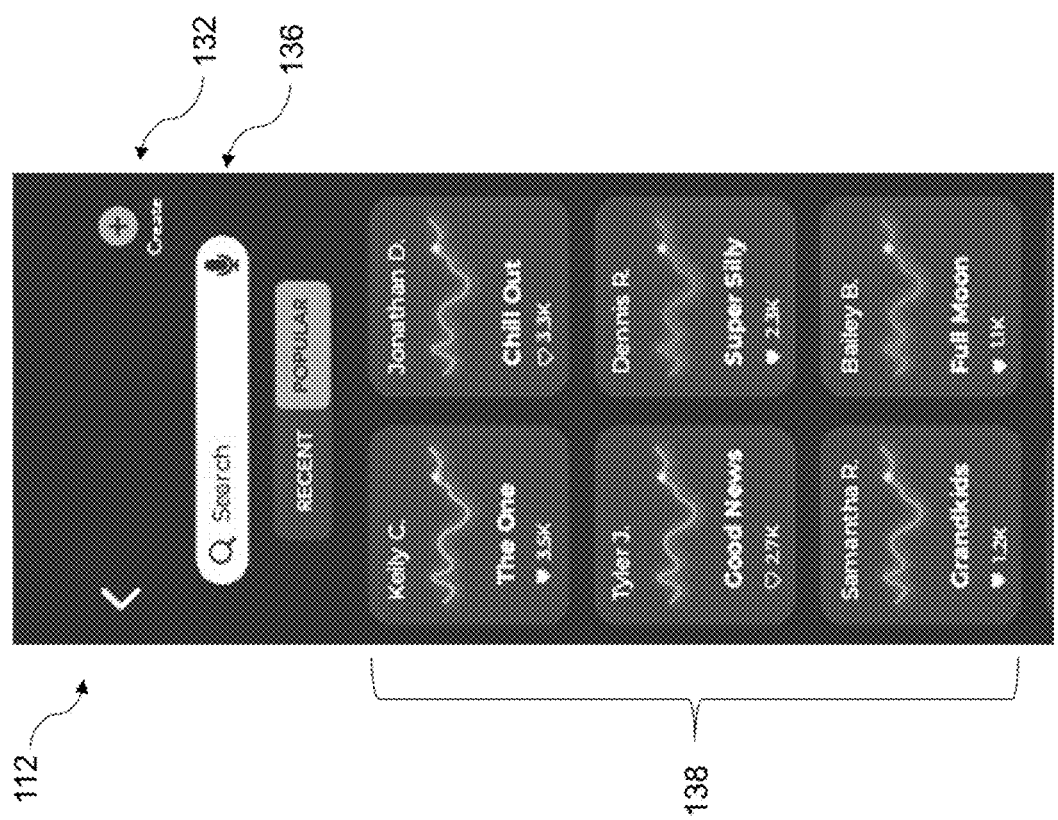
FIG. 10 depicts a schematic diagram of a search component that allows a user to search for Haptic Lines™ in a haptic creative studio, in accordance with embodiments of the present invention.
Figure 11:
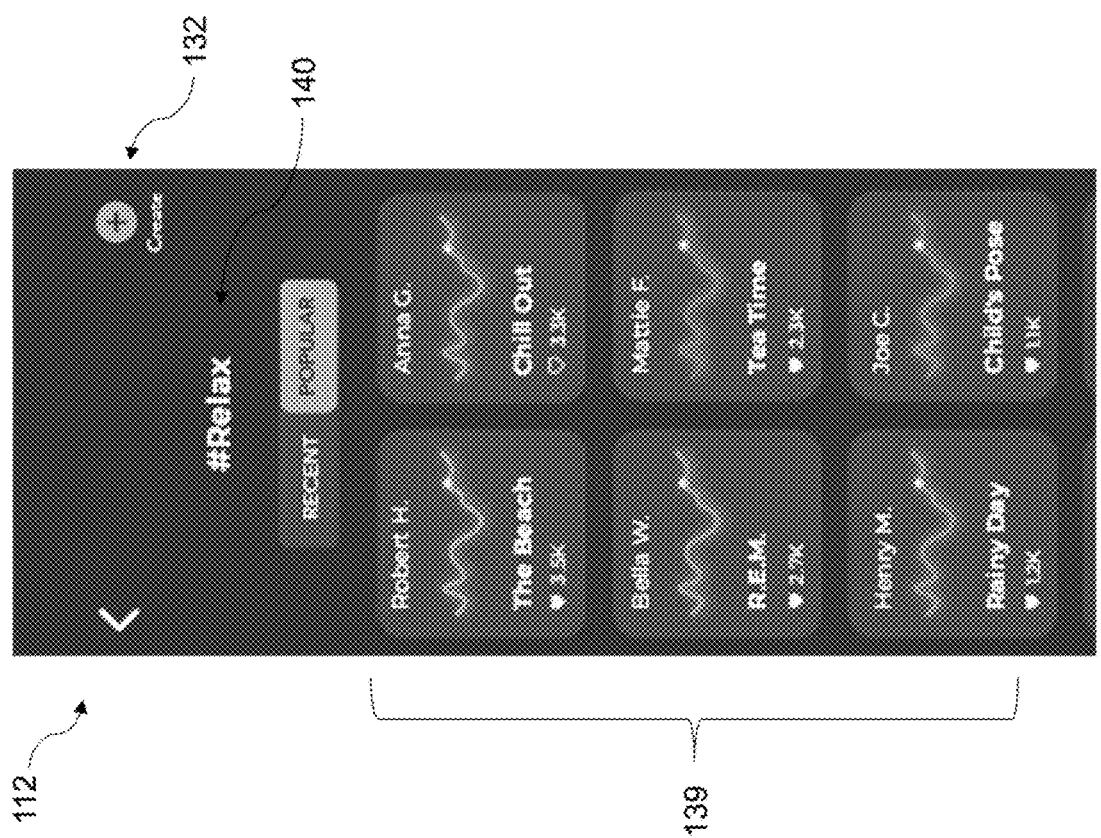
FIG. 11 depicts a schematic diagram of example search results from FIG. 10, in accordance with embodiments of the present invention.

FIG. 10 depicts a search feature 136 of the haptic creative studio 114, whereby the user 102 may search 136 for recent haptics or popular haptics. Examples of "popular" haptics 138 are depicted in FIG. 10. Examples of popular haptics 138 associated with the search term "relax" are depicted in FIG. 10 as popular haptics 139. The depiction of the popular haptics 139 (FIG. 11) for the haptic creative studio 114 (FIG. 30) may include a name of the user 102, a title of the haptic, an image or graphic of the haptic, and/or a quantity of "likes" of the given haptic, among other components not explicitly listed herein, such as color, additional text, and/or additional graphics or images. FIG. 11 illustrates #Relax interface 140.

Figure 12:
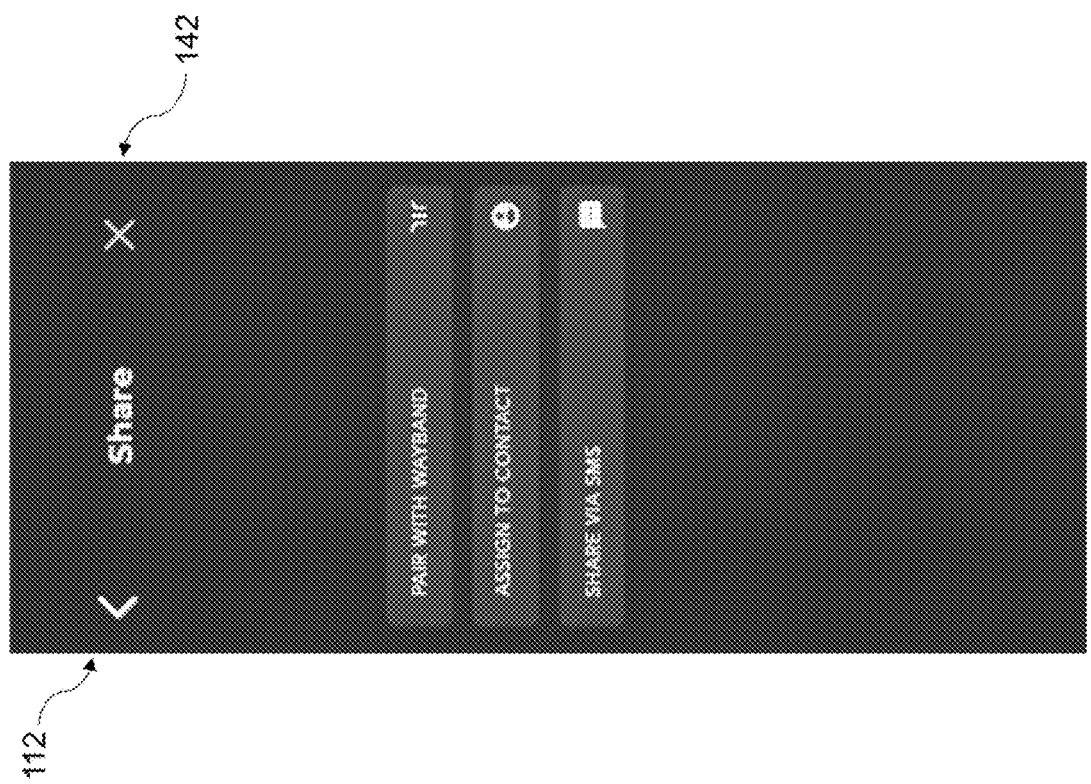
FIG. 12 depicts a schematic diagram of a screen to share one or more Haptic Lines™, in accordance with embodiments of the present invention.
Figure 13:
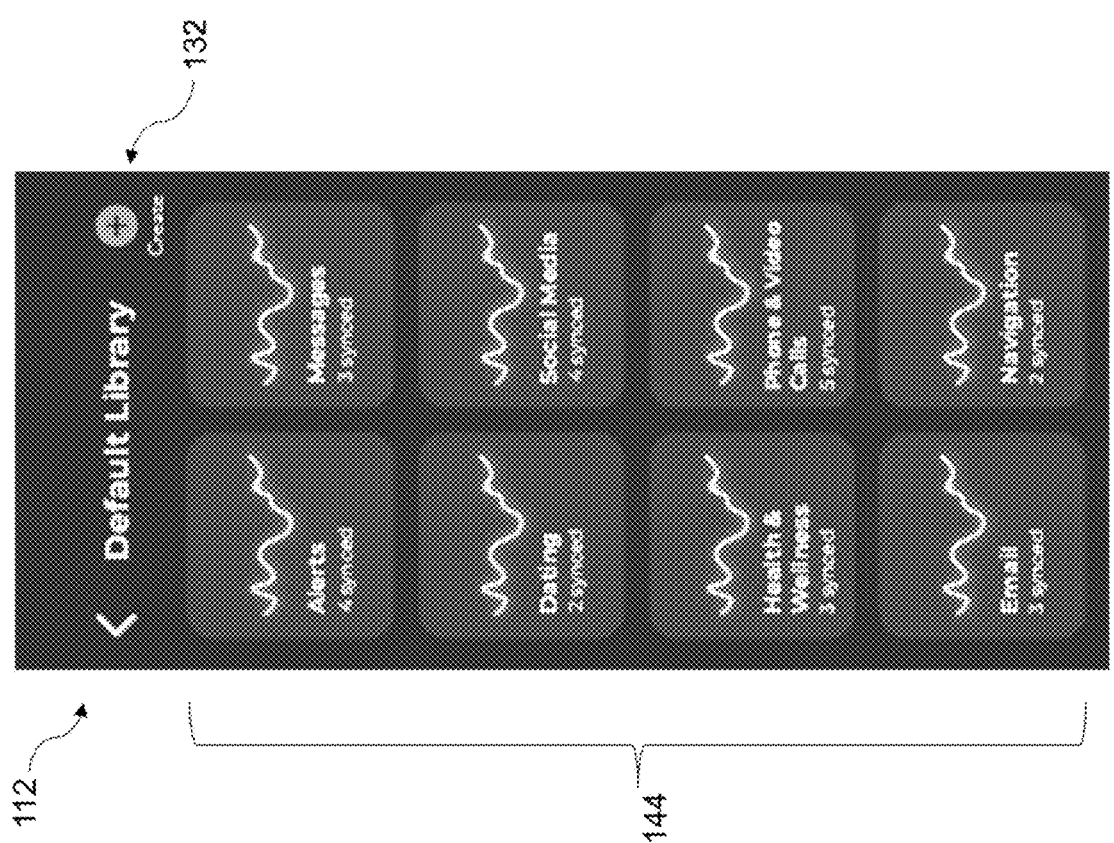
FIG. 13 depicts a schematic diagram of a screen displaying default Haptic Lines™ in a haptic creative studio, in accordance with embodiments of the present invention.
Figure 14:
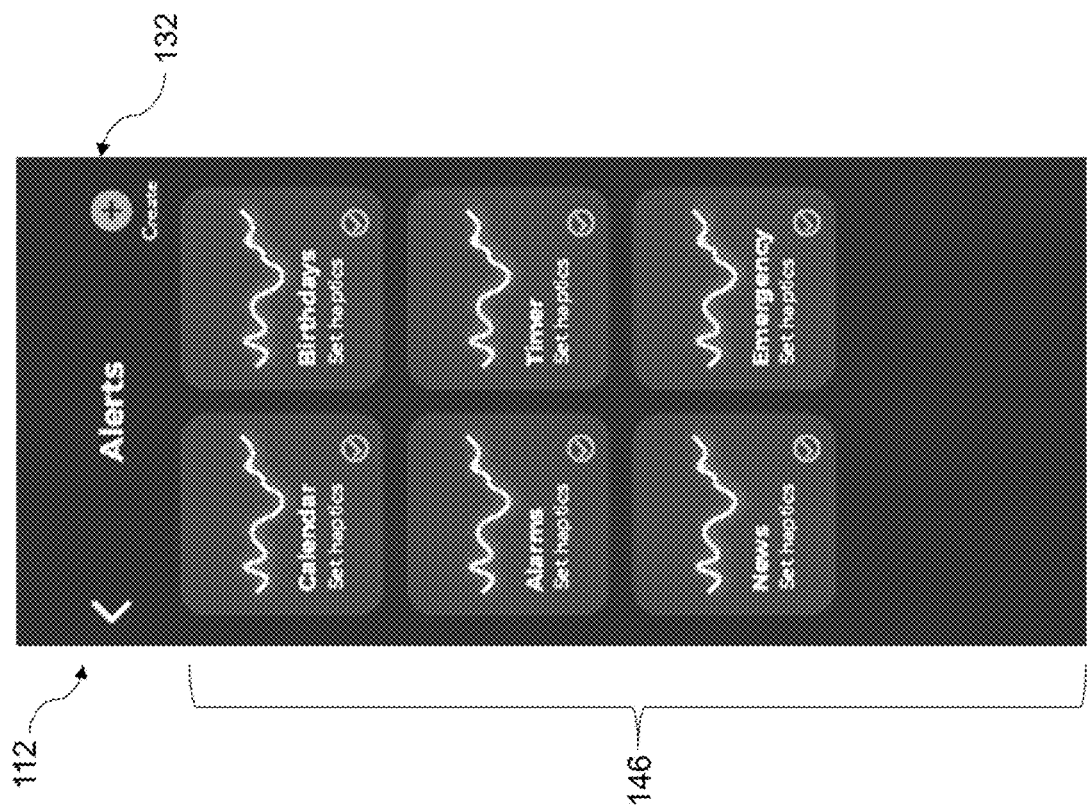
FIG. 14 depicts a schematic diagram of a screen showing Haptic Line™ associated with alerts in a haptic creative studio, in accordance with embodiments of the present invention.

FIG. 12 depicts an option in the haptic creative studio 114 for the user 102 to: (1) share a given haptic via the GUI 112 with a WAYBAND™, (2) assign the haptic to a contact, and/or (3) share the haptic via SMS messaging. As described herein, "WAYBAND™" is a wristband that navigates you to a destination using only vibration. In other examples, the haptic may be shared to another smart device, such as a smart wearable ring or watch, or shared via another form of messaging, such as email messaging. FIG. 13 depicts a group of haptics 144 of a default library, viewable via the GUI 112 to the user 102. FIG. 14 depicts a group of haptics 146 associated with alerts.

Figure 15:
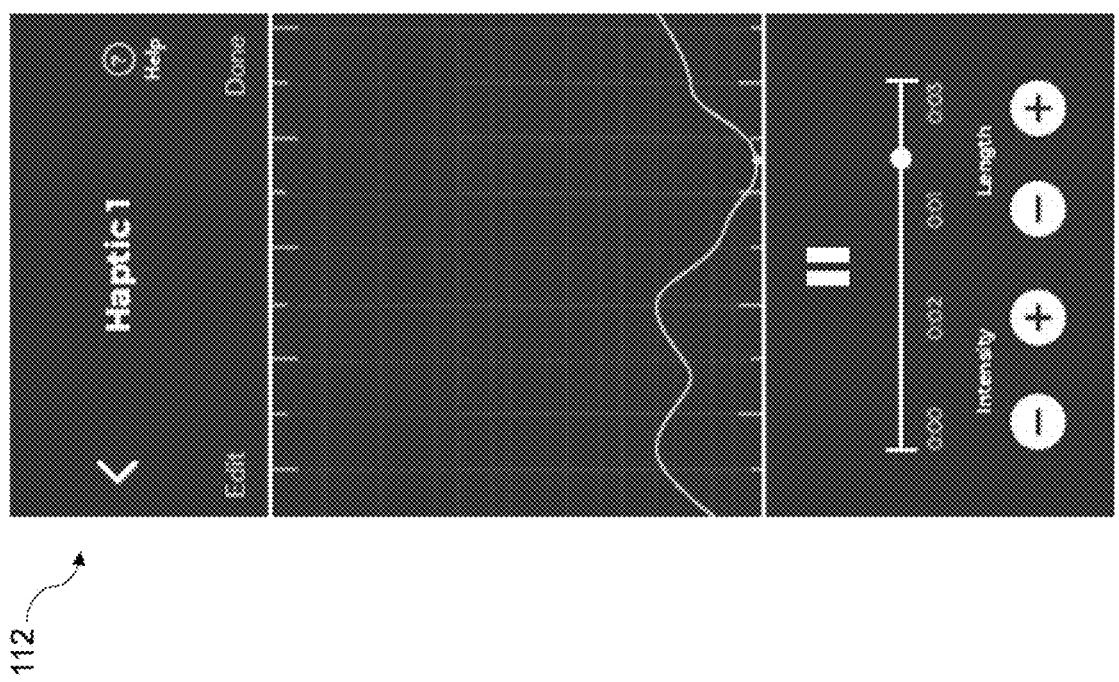
FIG. 15 depicts schematic diagrams of creating a Haptic Line™ in a haptic creative studio in a portrait mode, in accordance with embodiments of the present invention.
Figure 16:
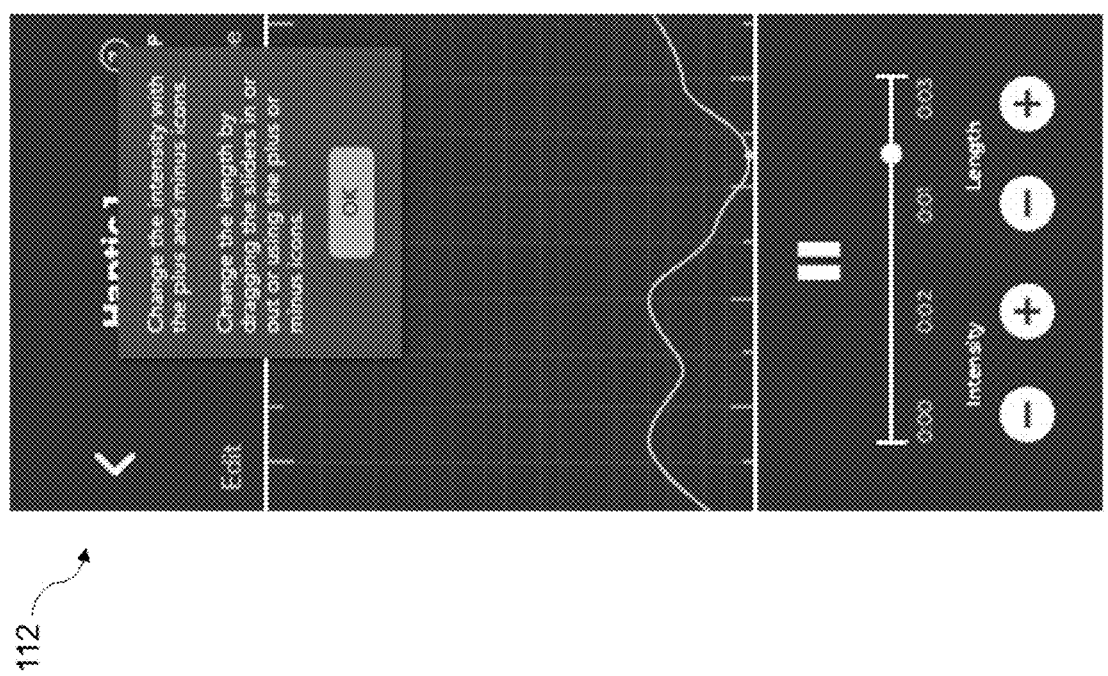
FIG. 16 depicts schematic diagrams of creating a Haptic Line™ in a haptic creative studio in a portrait mode, in accordance with embodiments of the present invention.
Figure 17:
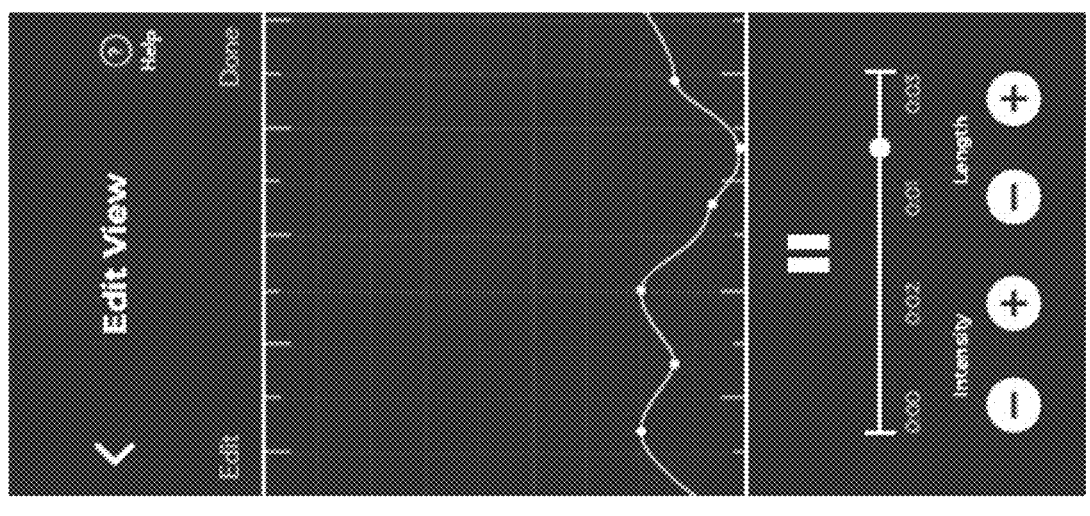
FIG. 17 depicts schematic diagrams of creating a Haptic Line™ in a haptic creative studio in a portrait mode, in accordance with embodiments of the present invention.

FIG. 15 and FIG. 16 depict a visual display of "Haptic 1", where the user 102 can increase or decrease the intensity and/or length of the Haptic Line™ in a standard portrait mode. In the portrait mode, the upper and lower intensities are defined by the edge of the drawing area. FIG. 17 depicts a result of the modification of the intensity and/or the length of the Haptic Line™ from FIG. 15 and FIG. 16.

Figure 19:
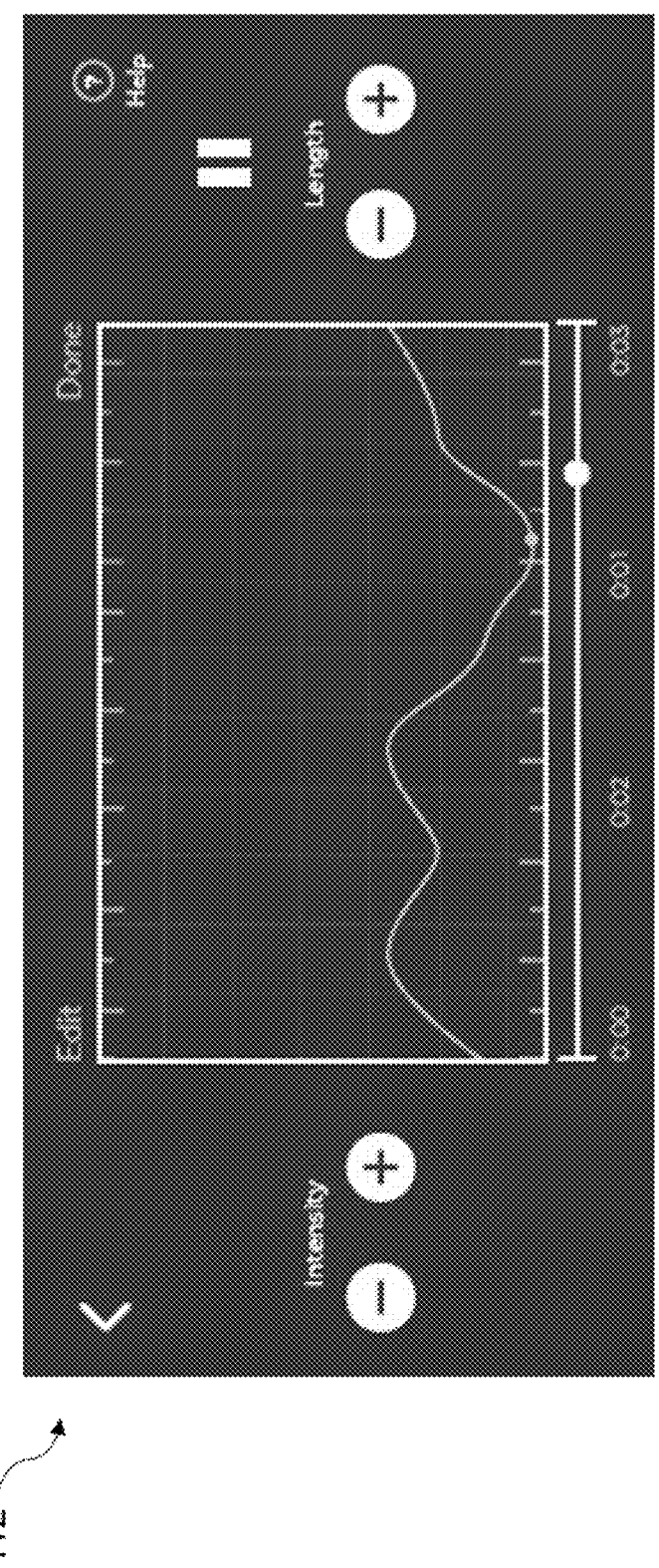
FIG. 19 depicts schematic diagrams of creating a Haptic Line™ in a haptic creative studio in a landscape mode, in accordance with embodiments of the present invention.
Figure 20:
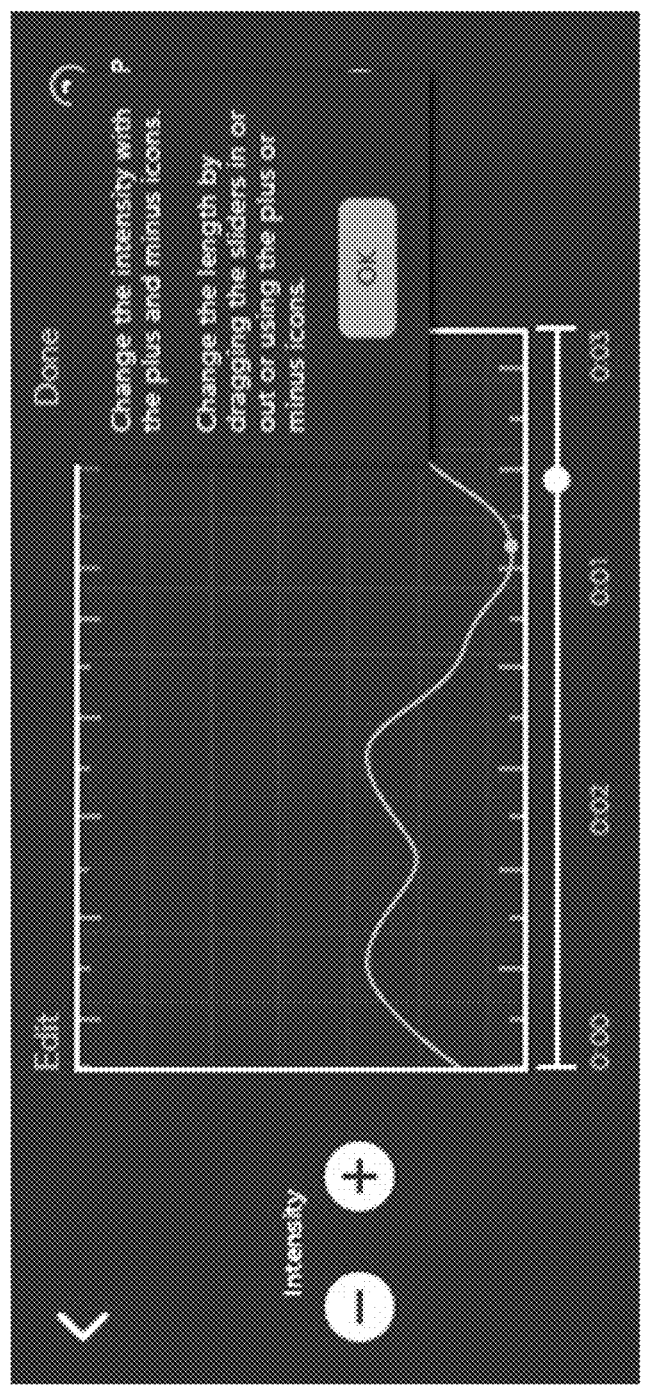
FIG. 20 depicts schematic diagrams of creating a Haptic Line™ in a haptic creative studio in a landscape mode, in accordance with embodiments of the present invention.
Figure 21:
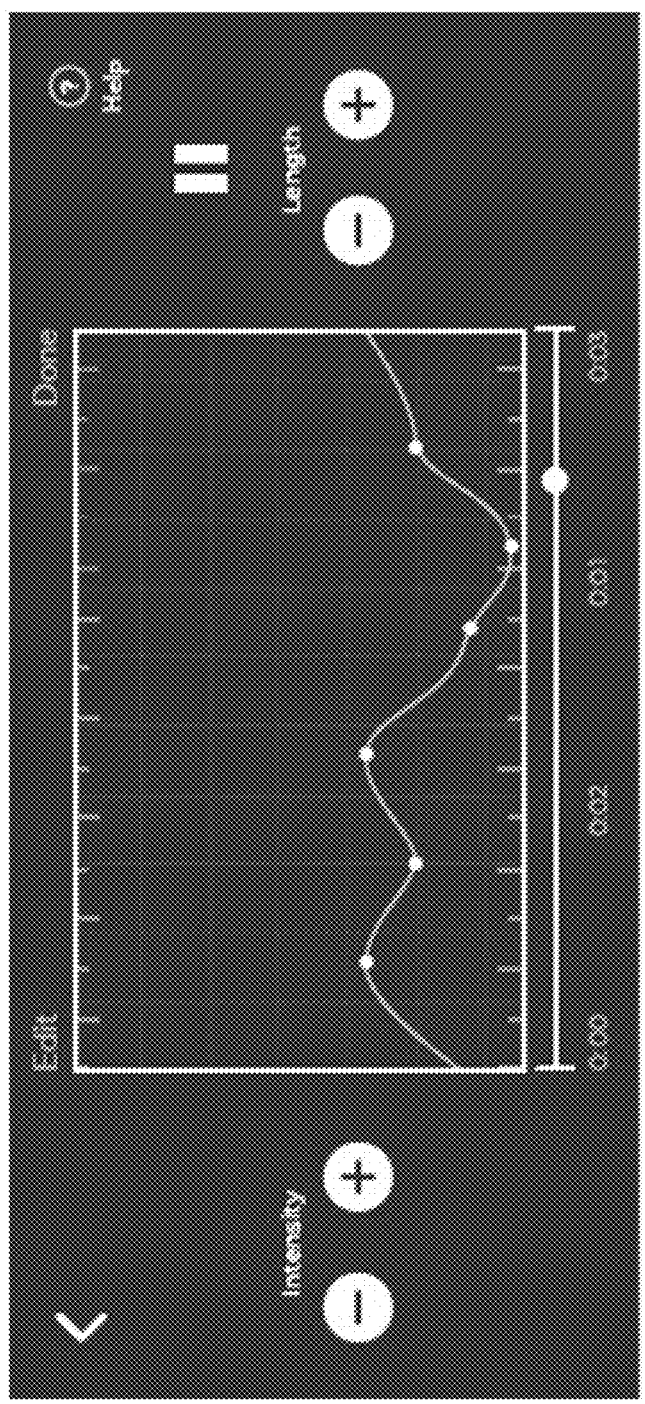
FIG. 21 depicts schematic diagrams of creating a Haptic Line™ in a haptic creative studio in a landscape mode, in accordance with embodiments of the present invention.

FIG. 19 and FIG. 20 depict a visual display of "Haptic 1", where the user 102 can increase or decrease the intensity and/or length of the Haptic Line™ in a landscape mode. In the landscape mode, the top and bottom of the computing device 104 screen edge defines the upper and lower intensities (bottom=0%, top=100%). FIG. 21 depicts a result of the modification of the intensity and/or the length of the Haptic Line™ from FIG. 19 and FIG. 20. In some examples, the user 102 may further customize the total haptic sharpness/softness ratio applied over the entire Haptic Line™.

Further, in some examples, a scrubber line may be displayed via the GUI 112 to show visually what portion of the Haptic Line™ is playing. It should be appreciated that the scrubber line movement will dictated by the duration and that the user 102 may drag his/her fingers to move the scrubber line manually. The Haptic Line™ will output in correspondence to the scrubber line location.

As such, once the Haptic Line™ is drawn in portrait or landscape mode, the Haptic Line™ is converted into a haptic file format for computing device 104, the WAYBAND™, or another smart device that allows for playback of the Haptic Line™ over the user-customized duration in vibrations that the user 102 can feel from the computing device 104 or directly from the WAYBAND™.

Figure 18:
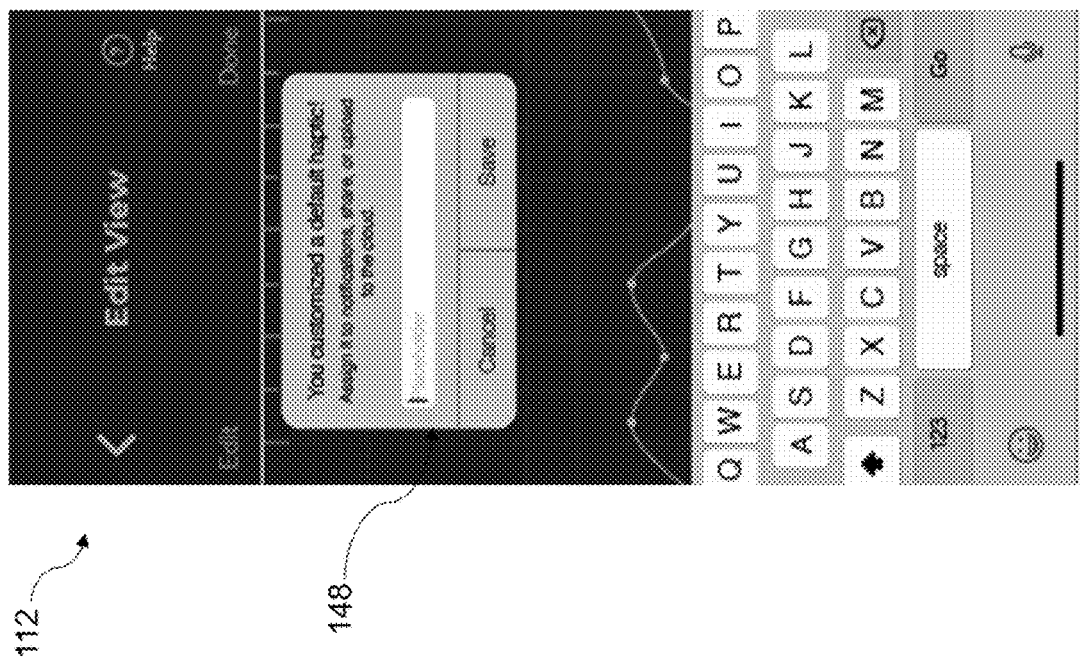
FIG. 18 depicts a schematic diagram of a screen to save a created Haptic Line™ in a haptic creative studio, in accordance with embodiments of the present invention.
Figure 22:
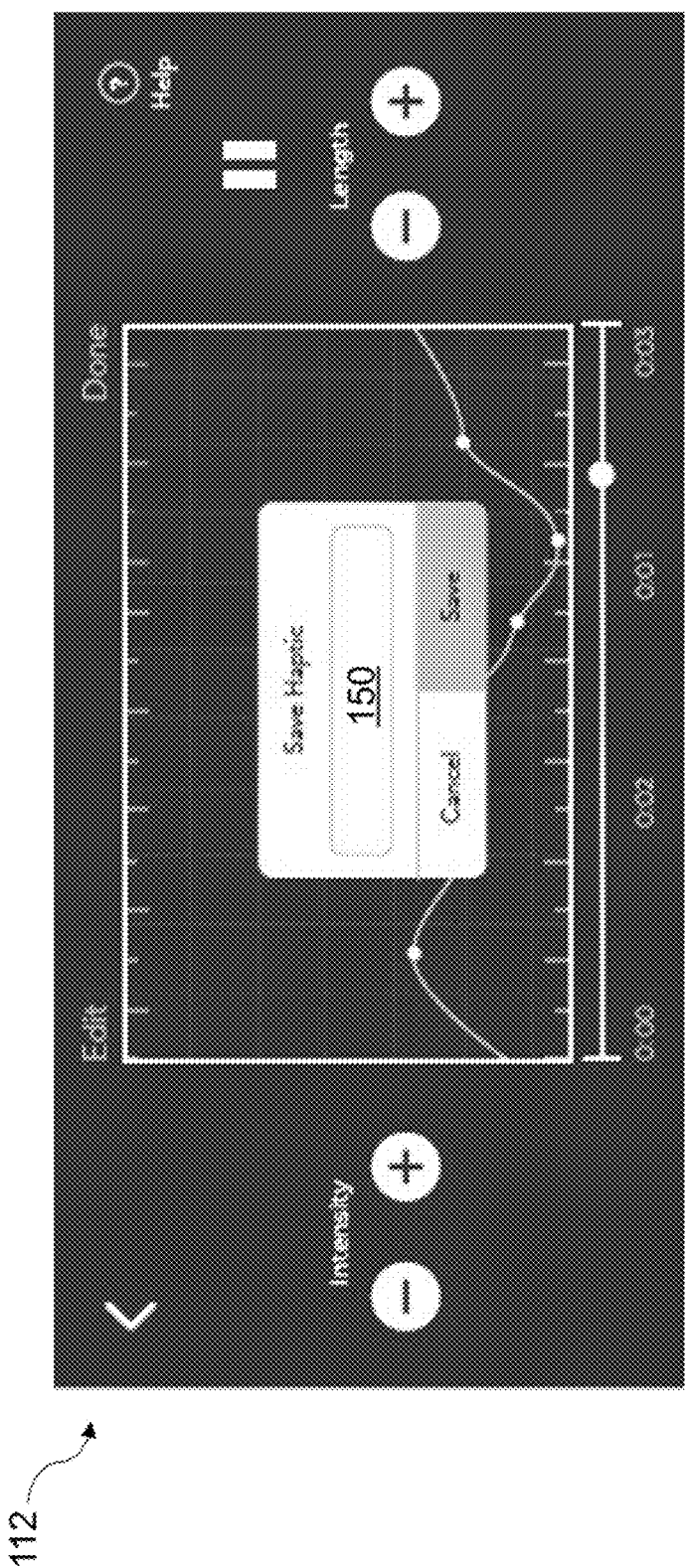
FIG. 22 depicts a schematic diagram of a screen to save a Haptic Line™ in a haptic creative studio, in accordance with embodiments of the present invention.

Further, once customized, the Haptic Line™ may be saved to the computing device 104 or the database 106 (e.g., via a save haptic box 148 of FIG. 18 or a save haptic box 150 of FIG. 22), shared, or assigned to a notification on the computing device 104. When saved to the database 106, other users may be given "public" access to the Haptic Line™ in the database 106 to try and download. To encourage sharing of these Haptic Lines™, the GUI 112 may display notifications of the number of "plays" their Haptic Line™ has received.

Figure 23:
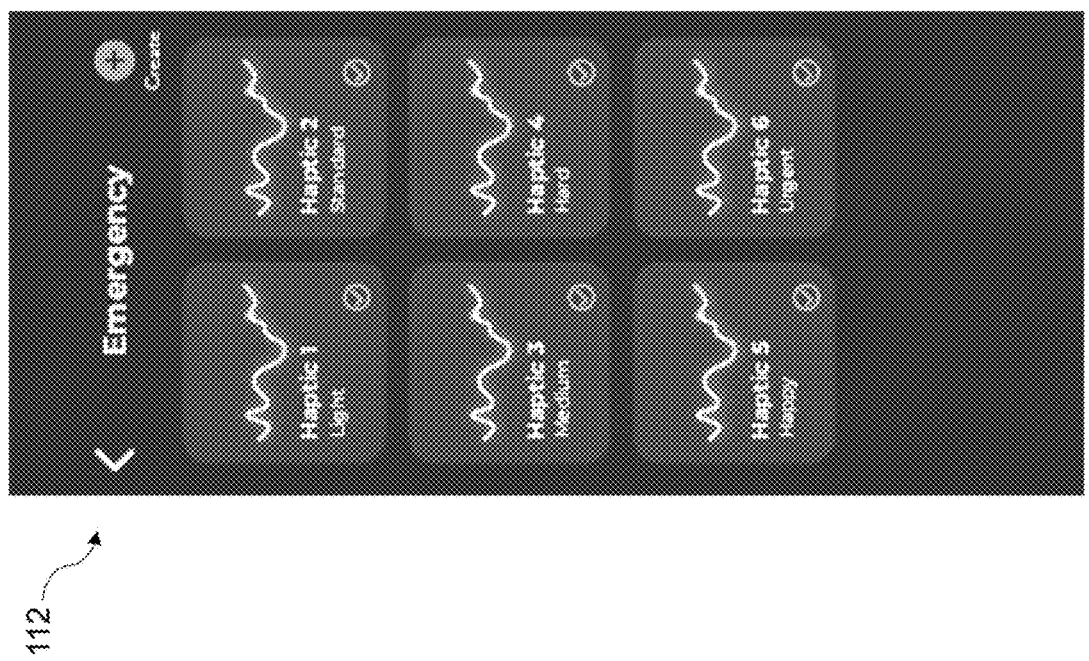
FIG. 23 depicts a schematic diagram of a screen associated with Haptic Lines™ designated for an emergency scenario, in accordance with embodiments of the present invention.
Figure 24:
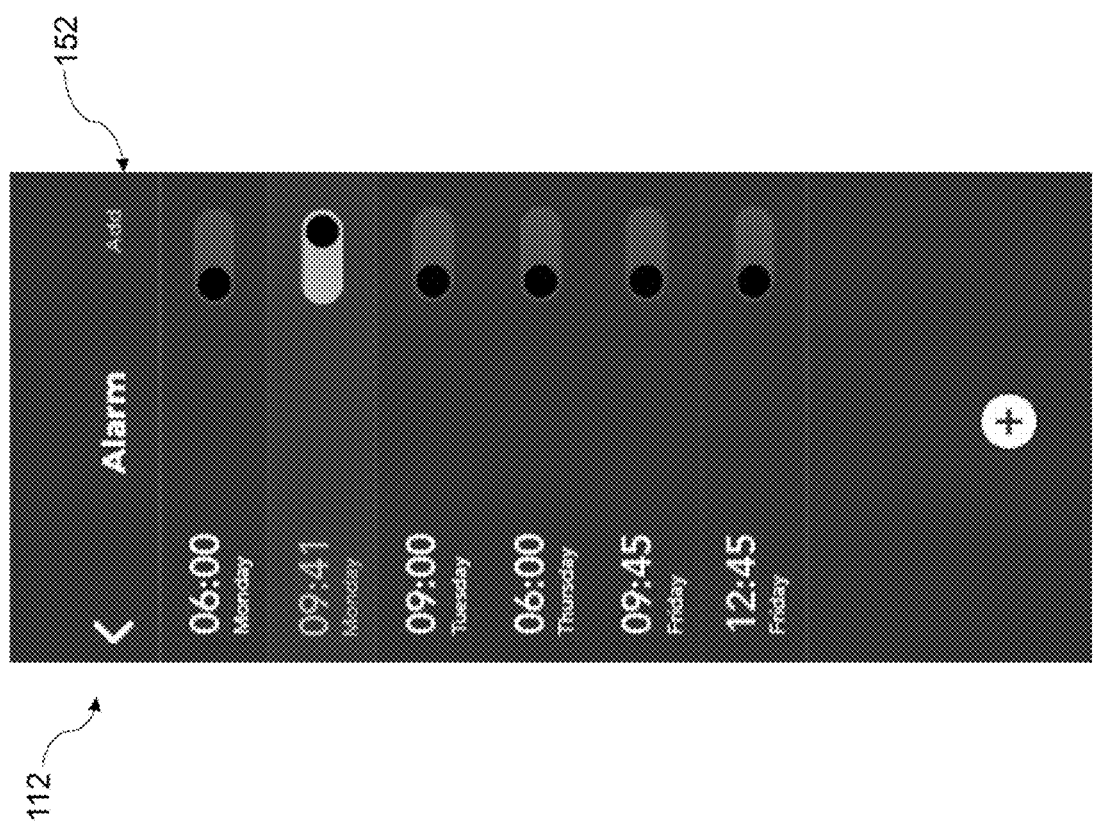
FIG. 24 depicts schematic diagrams to add a Haptic Line™ to an alarm in a haptic creative studio, in accordance with embodiments of the present invention.
Figure 25:
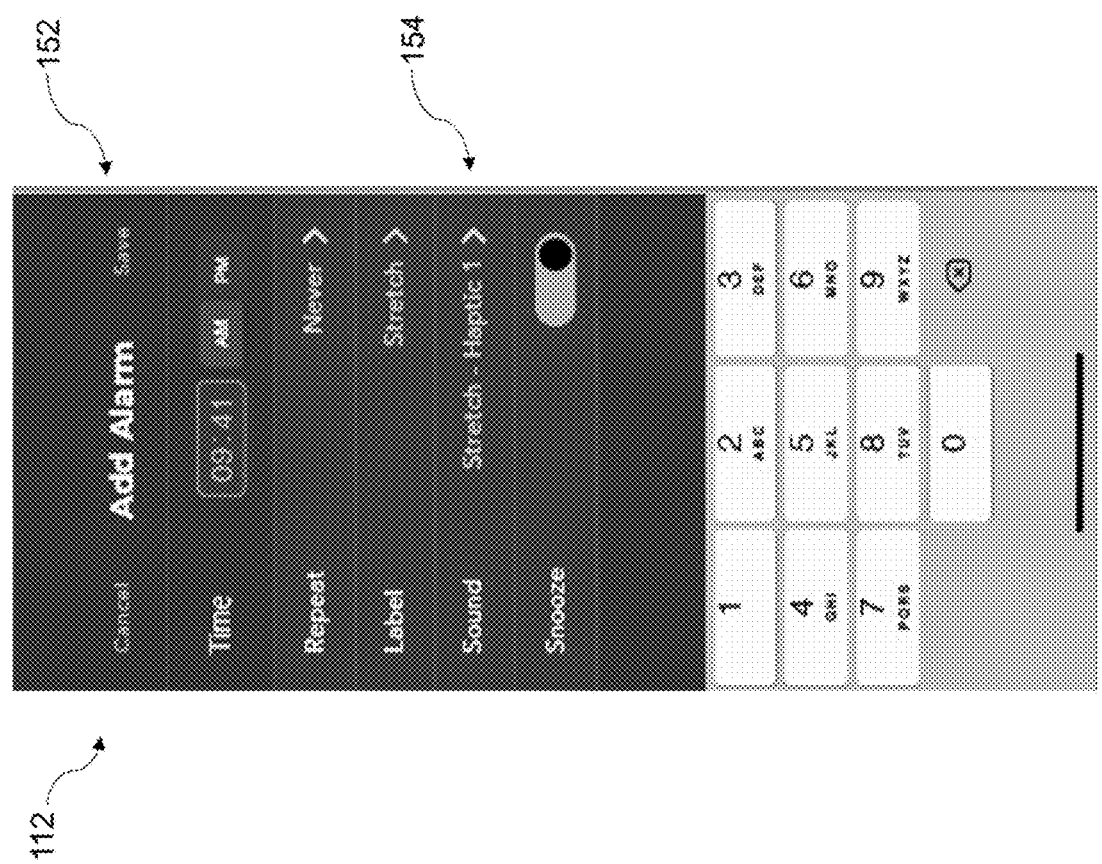
FIG. 25 depicts schematic diagrams to add a Haptic Line™ to an alarm in a haptic creative studio, in accordance with embodiments of the present invention.
Figure 26:
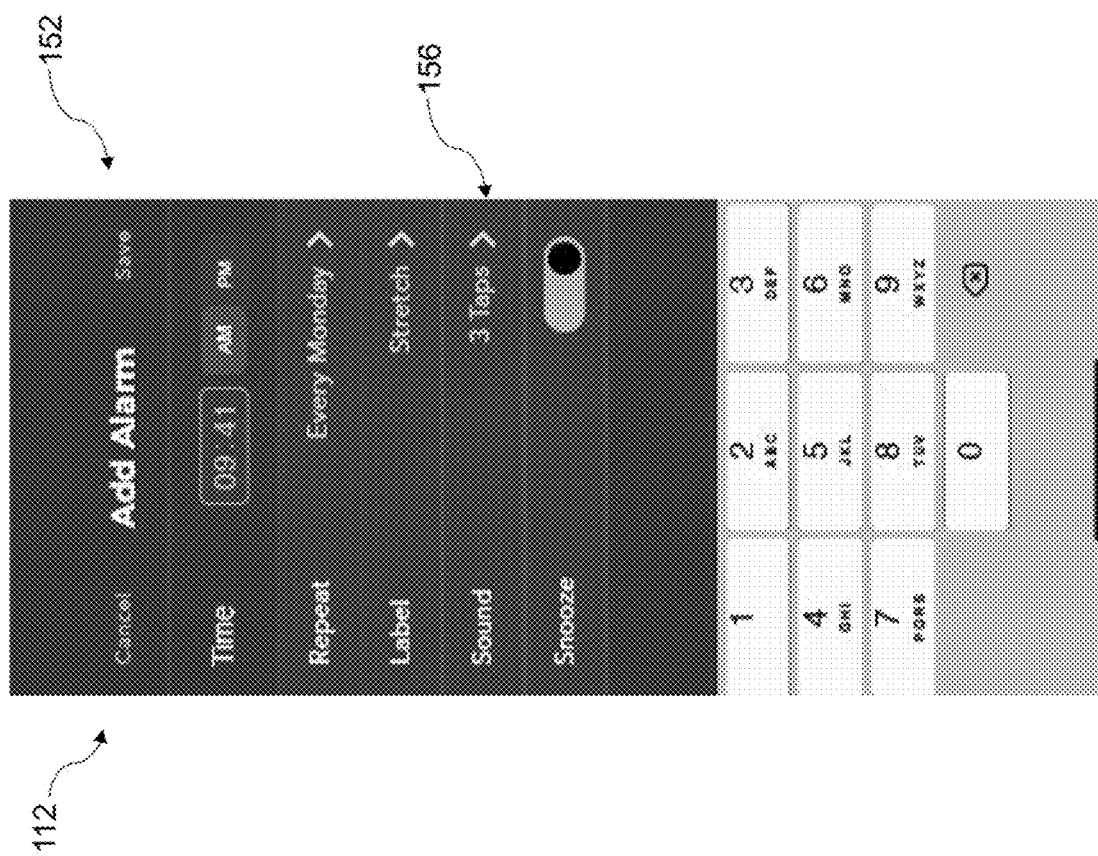
FIG. 26 depicts schematic diagrams to add a Haptic Line™ to an alarm in a haptic creative studio, in accordance with embodiments of the present invention.

FIG. 23 depicts a grouping of haptics designated by the user 102 as "emergency notifications". FIG. 24, FIG. 25, and FIG. 26 depict images of the Haptic Lines™ being assigned to a given alarm. An alarm may be created/added via an "add button" 152 (of FIG. 24). FIG. 25 depicts the user 102 assigning "Haptic 1" 154 as the sound for the added alarm and FIG. 26 depicts the user 102 adding a sound of "3 taps" 156 as the sound for the added alarm. It should be appreciated that the haptics may be assigned to other notifications, such as reminders, calendar appointments, etc. Further, in some examples, the user 102 can group multiple Haptic Lines™ together to create a Compound Haptic Line™.

Figure 27:
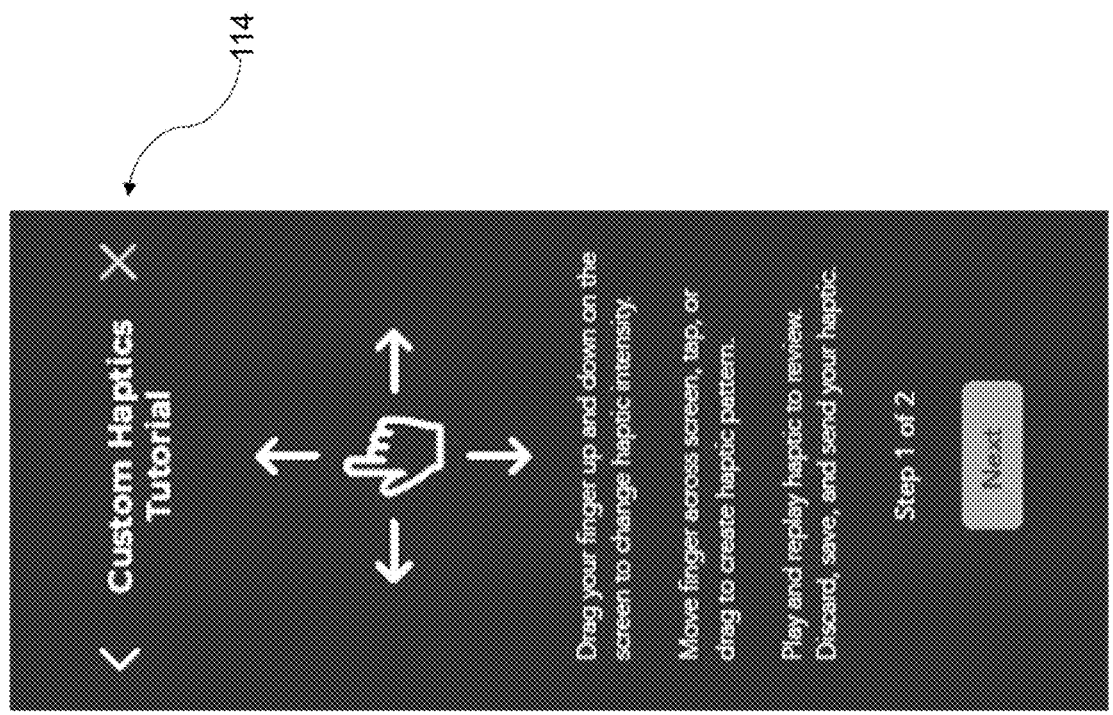
FIG. 27 depicts schematic diagrams describing a custom haptics tutorial associated with a haptic creative studio, in accordance with embodiments of the present invention.
Figure 28:
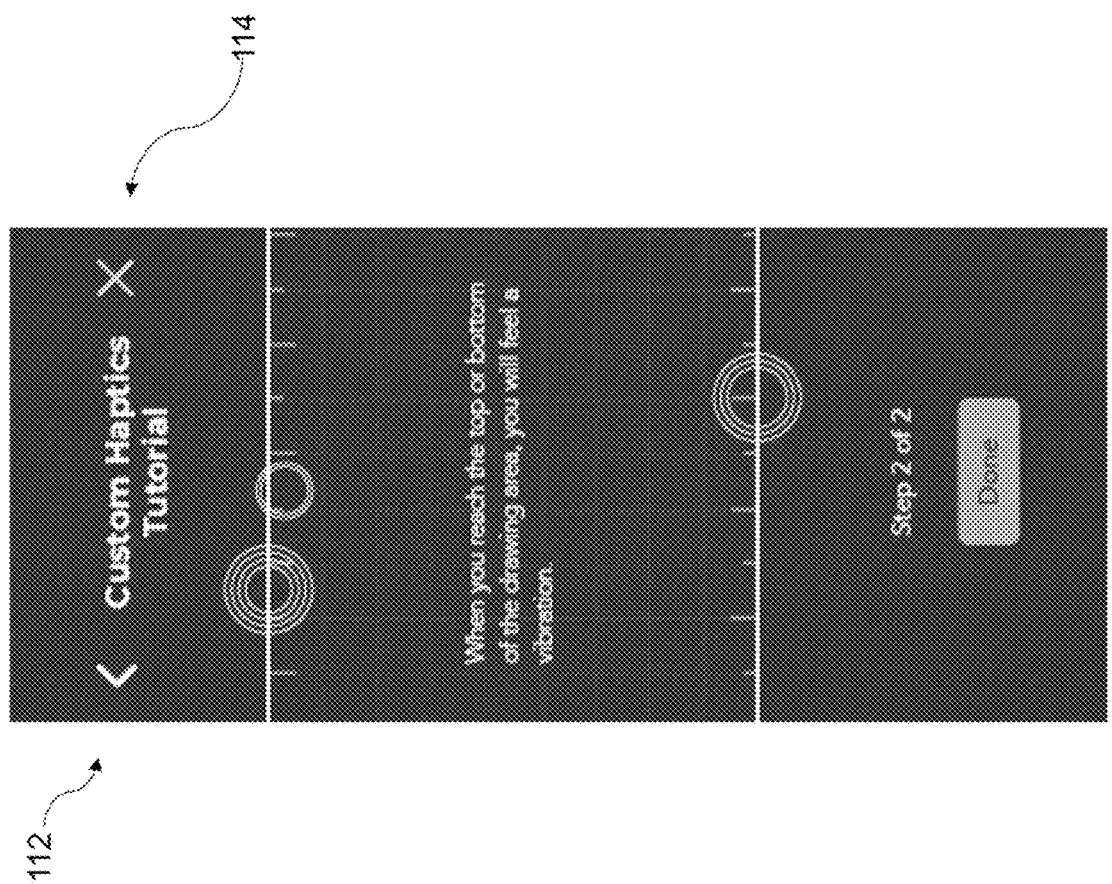
FIG. 28 depicts schematic diagrams describing a custom haptics tutorial associated with a haptic creative studio, in accordance with embodiments of the present invention.
Figure 29:
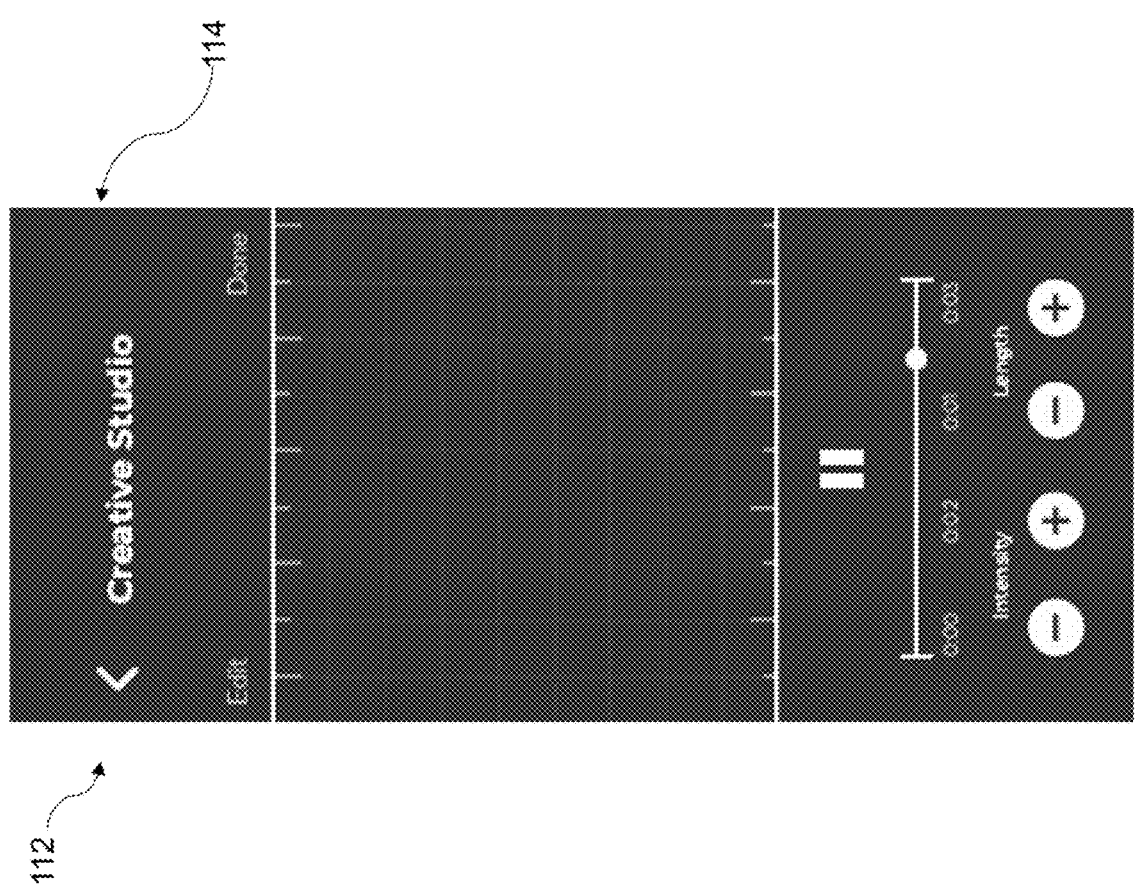
FIG. 29 depicts schematic diagrams of creating a Haptic Line™ in a haptic creative studio, in accordance with embodiments of the present invention.
Figure 30:
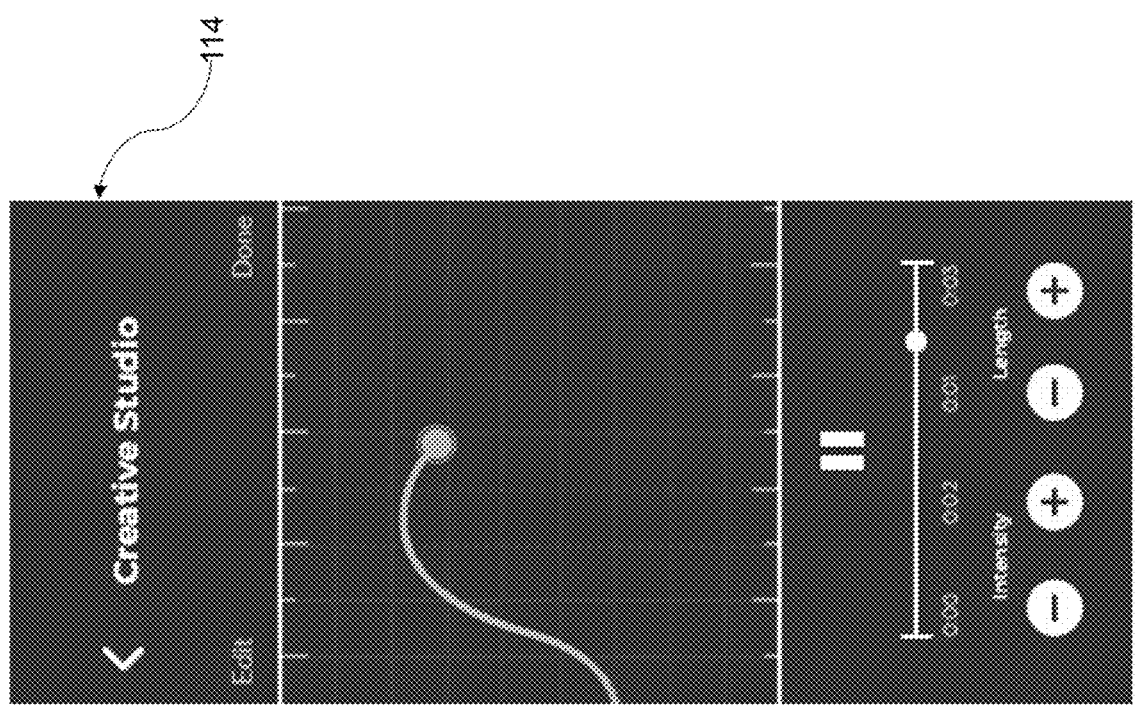
FIG. 30 depicts schematic diagrams of creating a Haptic Line™ in a haptic creative studio, in accordance with embodiments of the present invention.
Figure 31:
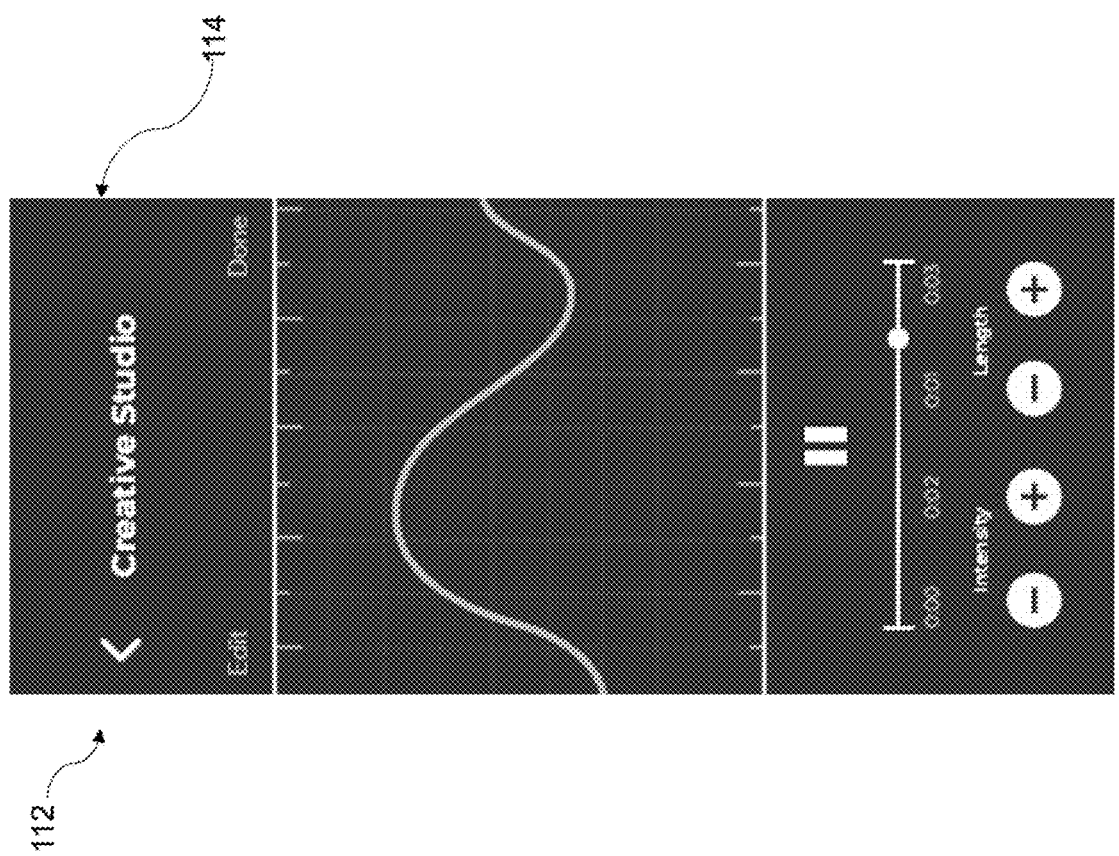
FIG. 31 depicts schematic diagrams of creating a Haptic Line™ in a haptic creative studio, in accordance with embodiments of the present invention.

FIG. 27 and FIG. 28 depict images of a tutorial for the haptic creative studio 114, where the user 102 is directed to: (1) drag his/her fingers up and down on the screen to modify the intensity of the Haptic Line™, (2) move his/her fingers across the screen, tap, or drag to create the Haptic Line™, (3) play and replay the Haptic Line™ to review the customized Haptic Line™, and (4) discard, save, and send the customized Haptic Line™ to another party. FIG. 29-FIG. 31 depict creation of the customized Haptic Line™ based on the tutorial described in FIG. 27-FIG. 28.

Figure 32:
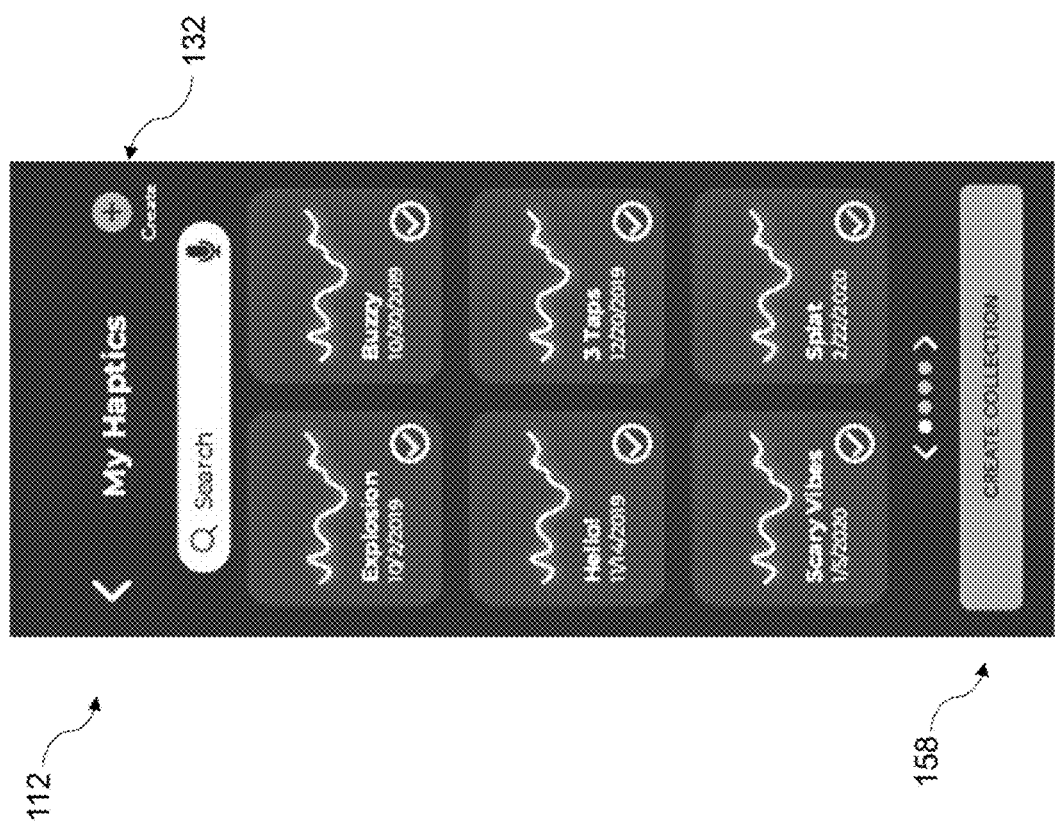
FIG. 32 depicts a schematic diagram of a MyHaptics screen containing Haptic Lines™ of a user, in accordance with embodiments of the present invention.
Figure 33:
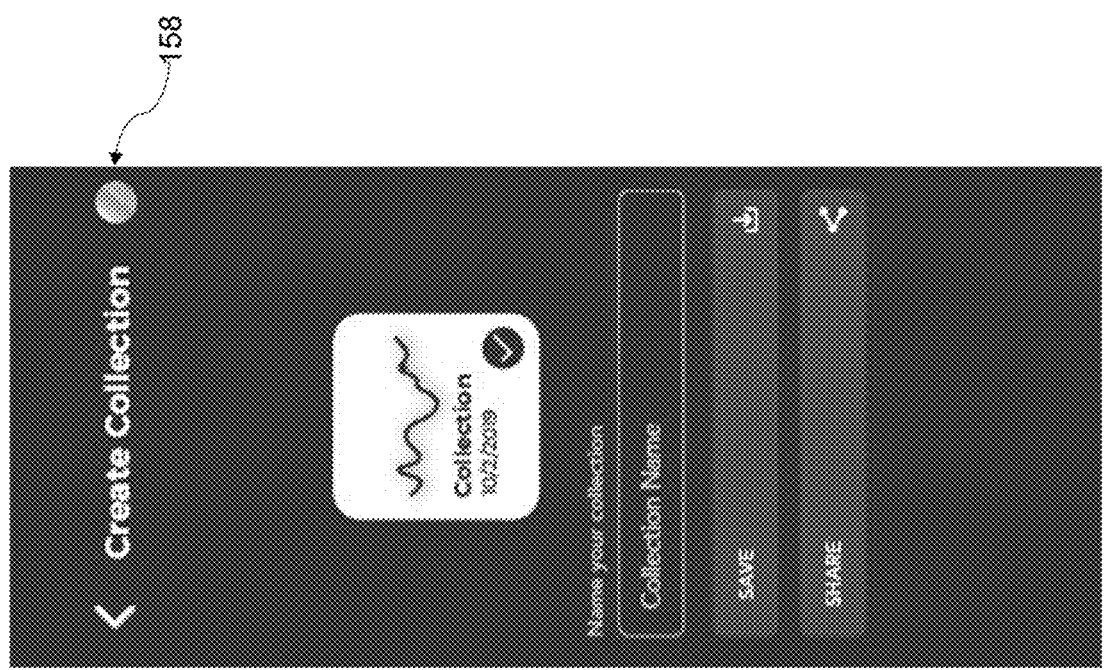
FIG. 33 depicts a schematic diagram associated with creating a haptics collection containing Haptic Lines™ in a haptic creative studio, in accordance with embodiments of the present invention.
Figure 34:
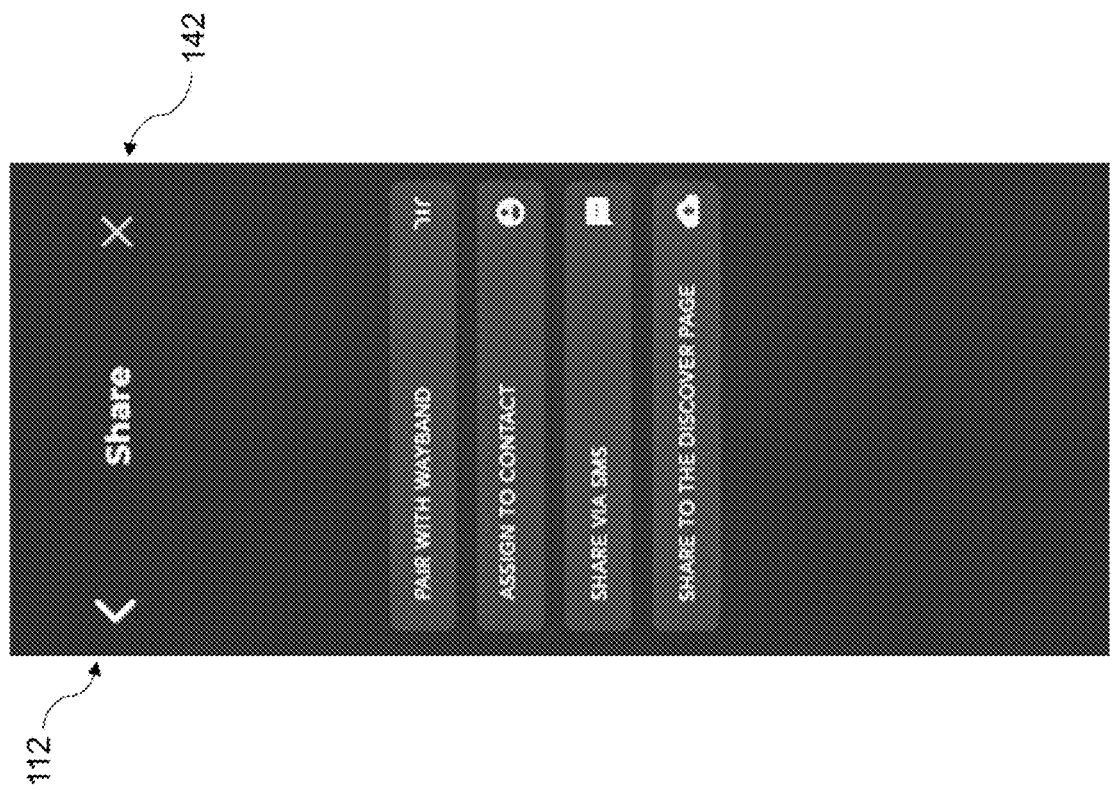
FIG. 34 depicts a schematic diagram depicting sharing of a haptics collection from a haptic creative studio, in accordance with embodiments of the present invention.

FIG. 32 depicts the grouping of user-created haptics (e.g., "My Haptics"), with an option for the user 102 to create a haptic collection 158. During the creation of the haptic collection 158, the user 102 may assign a color 158 to the given collection, assign a name to the collection, save the collection, and/or share the collection, as shown in FIG. 33. The user 102 may: (1) share 142 a given haptic collection 158, as shown in FIG. 34, to the WAYBAND™ or another smart device paired with the computing device 104, (2) assign the haptic collection 158 to a contact of the computing device 104, (3) share the haptic collection 158 via SMS or email messaging, and/or (4) share the haptic collection 158 to a discovery page, among others.

Figure 36:
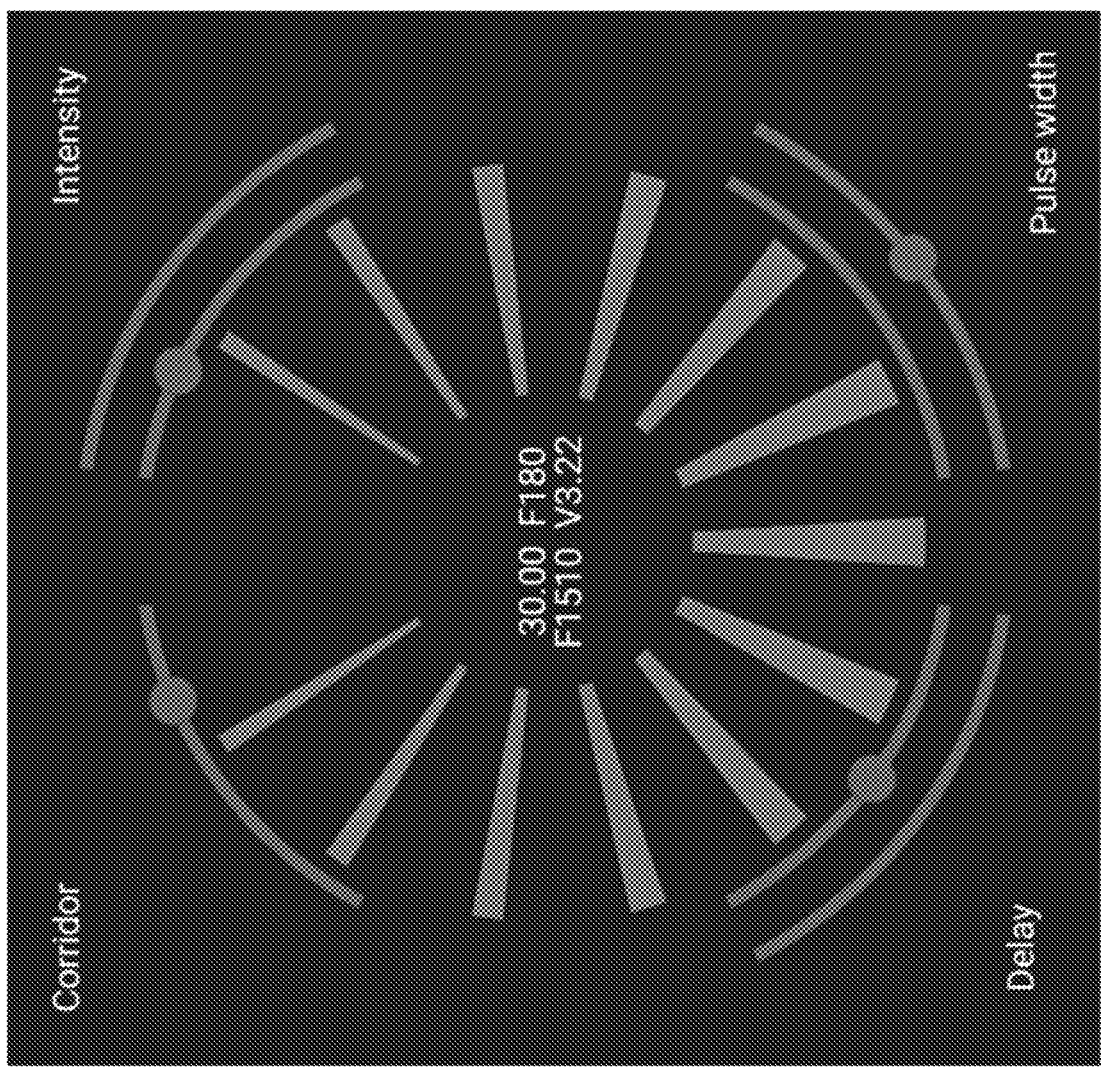
FIG. 36 depicts a schematic diagram depicting a user interface of a control mechanism that uses a haptic wheel to map a user's orientation from a target angle to specific haptic patterns, in accordance with embodiments of the present invention.

FIG. 36 depicts a schematic diagram depicting a user interface of a control mechanism that uses a haptic wheel system 3600 to map a user's orientation from a target angle to specific haptic patterns. FIG. 36 further delineates the functionality of a haptic wheel system 3600 that enables personalized mapping of angular differences, measured in degrees, between a user's orientation and a target to specific haptic patterns. Adjustment of sliders within this system correlates with visual representations as radial lines, symbolizing parameters such as intensity (color), delay (spacing), and pulse width (width). The numerical values displayed within the interface represent selectable parameter ranges for input into the sdk. Corridor slider, defining the width in degrees around the target orientation where the user feels no haptic sensation, ranging from approximately 0 degrees to approximately 360 degrees. In the upper-right section, the intensity sliders control the strength of each haptic pulse. The system provides options for a fixed value (inner slider) that remains constant regardless of the user's orientation, ranging from approximately 0 to approximately 300, and a variable value (outer slider) that intensifies as the user deviates further from the target angle, ranging from about 0.1 to about 100.0. Moving to the lower-left section, the delay sliders regulate the time interval between haptic pulses. Similar to intensity, there are fixed and variable options, with the fixed value (inner slider) ranging from 30 to 3000 milliseconds and the variable value (outer slider) shortening as the user moves away from the target angle, ranging from about 0.1 to about 100.0. Finally, in the lower-right section, the Pulse Width sliders control the duration of each haptic pulse. Similar to the previous sections, there are fixed and variable options, with the fixed value (inner slider) ranging from about 0.3 milliseconds to about 2000 milliseconds and the variable value (outer slider) increasing as the user turns further from the target angle, ranging from about 0.1 to about 100.00. This intricate system allows users precise control over haptic feedback customization based on their orientation relative to the target angle.

Figure 37:
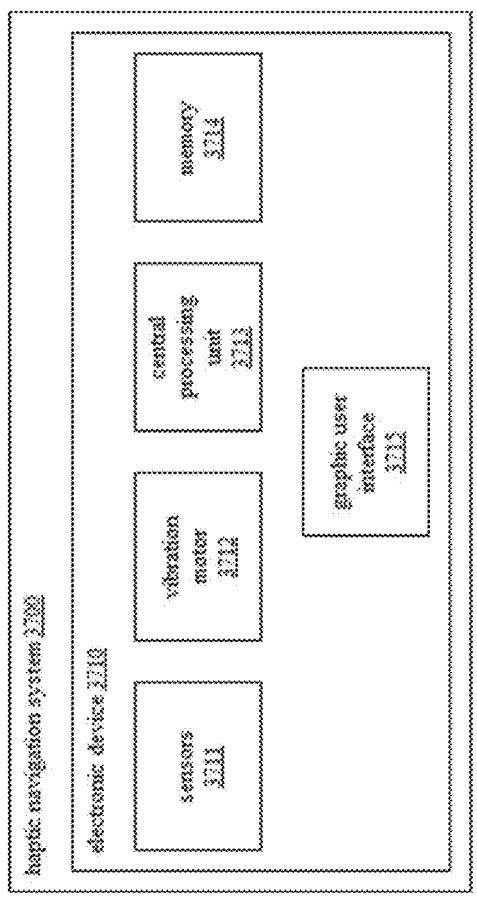
FIG. 37 is a block diagram illustrating a haptic navigation system, according to some embodiments of the present disclosure.

FIG. 37 is a block diagram that describes a haptic navigation system 3700, according to some embodiments of the present disclosure. In some embodiments, the haptic navigation system 3700 may include an electronic device 3710 such as a haptic navigation device. The electronic device 3710 may include one or more sensors 3711, a central processing unit 3713 (CPU), and a graphic user interface 3715 (GPI) configured to interact with the haptic feedback. The electronic device 3710 may also include a vibration motor 3712. The vibration motor 3712 is configured to generate haptic feedback based on mapped patterns based on the orientation of the electronic device 3710 relative to the target. The electronic device 3710 may also include a memory 3714. The memory 3714 is configured to store the mapping of the dynamic haptic patterns.

In some embodiments, at least an angular sensor is provided. The angular sensor is configured to detect angular data of an angle between an orientation of the electronic device 3710 and a target. The CPU is configured to execute instructions to implement the haptic navigation system 3700 to interpret the angular data that may be output from the angular sensor. Translation of the angular data is configured to form a mapping of dynamic haptic patterns. Control of the vibration motor 3712 of the electronic device 3710 may be implemented to correspond to the mapping of the dynamic haptic patterns.

In some embodiments, the memory 3714 may be configured to store a predetermined haptic parameter values. In some embodiments, the angular data may be mapped using one or more mapping algorithms. In some embodiments, the haptic feedback may be a vibration output. In some embodiments, the vibration output may be a frequency change. In some embodiments, the vibration output may be an amplitude change.

In some embodiments, the vibration output may be intermittent. In some embodiments, the vibration output may be continuous. In some embodiments, the vibration output may include a range of about 0 Hz to about 1000 Hz. In some embodiments, the vibration output may include a gradient transition from a substantially low intensity to a substantially to high according to the orientation determined by the angular data. In some embodiments, the haptic navigation system 3700 may include an adaptive control algorithm to dynamically adjust parameters in real-time. In some embodiments, at least one of geolocation, a gyroscope, and an accelerometer.

Figure 38:
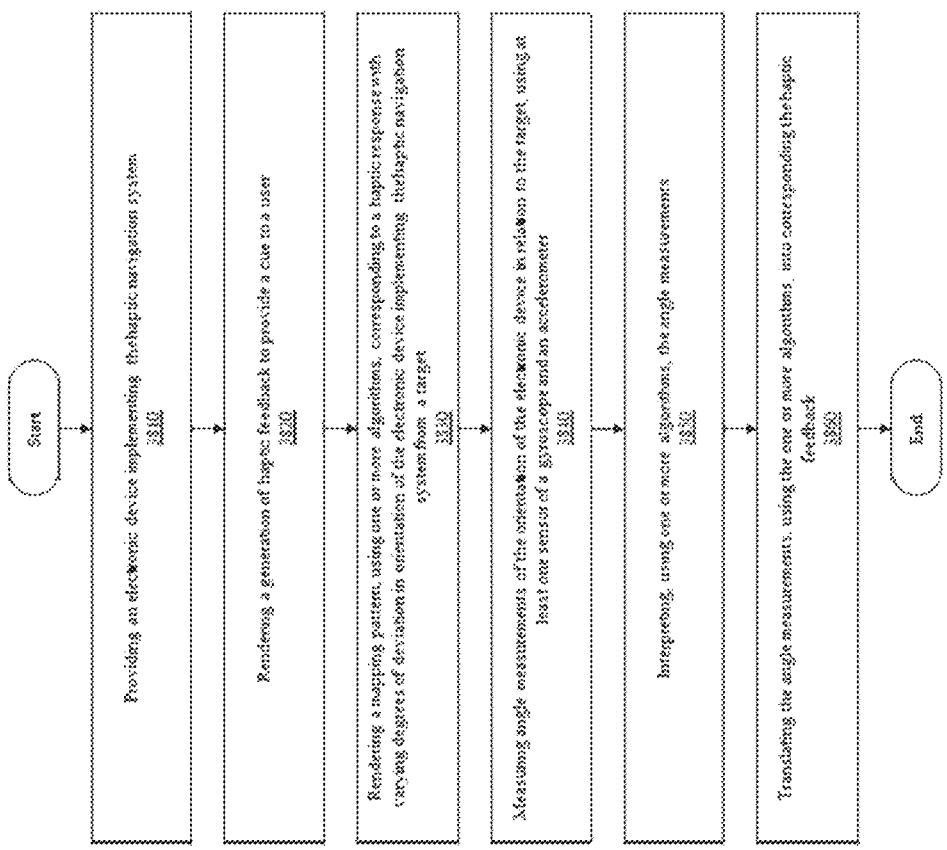
FIG. 38 is a flowchart illustrating a method of implementing a haptic navigation system, according to some embodiments of the present disclosure.

FIG. 38 is a flowchart that describes a method of implementing a haptic navigation system, according to some embodiments of the present disclosure. In some embodiments, at 3810, the method may include providing an electronic device, such as a haptic navigation device, implementing the haptic navigation system. At 3820, the method may include rendering a generation of haptic feedback to provide a cue to a user. At 3830, the method may include rendering a mapping pattern, using one or more algorithms, corresponding to a haptic response with varying degrees of deviation in orientation of the electronic device implementing the haptic navigation system from a target.

In some embodiments, at 3840, the rendering may include measuring angle measurements of the orientation of the haptic navigation device in relation to the target, using at least one sensor of a gyroscope and an accelerometer. At 3850, the rendering may include interpreting, using one or more algorithms, the angle measurements. At 3860, the rendering may include translating the angle measurements, using the one or more algorithms, into corresponding the haptic feedback.

In some embodiments, the haptic feedback may be a vibration output. In some embodiments, the vibration output may be a frequency change. In some embodiments, the vibration output may be an amplitude change. In some embodiments, the vibration output may be intermittent. In some embodiments, the vibration output may be continuous. In some embodiments, the vibration output may have a range of about 0 Hz to about 1000 Hz. In some embodiments, the method may include dynamically adjusting parameters in real-time using an adaptive control algorithm.

The Haptic Navigation system may include vibration output, either through alterations in frequency or amplitude, presenting either rhythmic beats or a seamless, continuous haptic sensation. In an embodiment, the haptic output ranges broadly from 0 to 1000 Hz and works in conjunction with a suite of sensors tied to orientation, including geolocation, gyroscope, accelerometer, and similar sensors commonly present in smartphones (typically operating within a general range of 150 to 180 Hz). Further, the strength modulation of the haptic feedback correlates with the movement of the haptic navigation device including, but not limited to, a smartphone and/or a wearable device. In a first case, no vibration occurs when the haptic navigation device is facing the "correct direction," and the vibration is gradually intensifying to the highest vibration when facing the wrong direction. In a second case, the highest vibration may be felt when the haptic navigation device is oriented correctly at which the target object and/or location is substantially coplanar with the haptic navigation device. Thus, reducing to no vibration when facing the wrong direction. The transition between these states forms a smooth gradient based on sensor-derived orientation data.

Moreover, when the haptic navigation device is aligned in the correct direction, a distinctive "heartbeat pulse" haptic feedback is generated to signify the correct orientation. This pulsation may be adjusted within a frequency range of 0 to 5 seconds, functioning as a tempo indicator.

In an embodiment, the Android version incorporates a specific haptic customization interface known as the "Haptic Wheel." This interface offers similar functionalities to the Haptic Line but is designed differently, providing users with practical functions to tailor their haptic navigation experience according to their preferences and orientation needs.

Figure 39:
FIG. 39 is an illustration of a Project Guideline simulator implementing sound and haptic feedback in the haptic navigation system, according to some embodiments of the present disclosure.

FIG. 39 is an illustration of a Project Guideline simulator 3900 implementing sound and haptic feedback in the haptic navigation system to guide runners, such as a blind marathon runner or any individual. Implementing sound and haptic feedback in the haptic navigation system for guiding runners may include integrating sensor data with an algorithmic framework to create a comprehensive feedback system. The process may begin with the collection of real-time environmental data using sensors such as GPS, accelerometers, gyroscopes, and proximity sensors. These sensors capture the runner's position, movement, orientation, and environmental conditions. The gathered data may then be processed and interpreted through one or more algorithms that compute the optimal route and generates navigation instructions. This algorithm may consider various factors such as the runner's speed, upcoming obstacles, terrain changes, and the desired destination. For haptic feedback, actuators or vibrational motors integrated into wearable devices, such as a mobile device, a ring, a wristband and/or a belt may be employed to convey directional cues and alerts to the runner. These haptic cues are carefully designed to provide subtle yet distinct vibrations that guide the runner along the designated path. For instance, a series of vibrations on the left side might indicate a left turn, while a continuous vibration might signal an obstacle ahead.

Concurrently, sound feedback is employed to offer supplementary guidance. Audio cues, delivered through headphones or bone conduction devices, complement the haptic feedback. These auditory signals could include spoken instructions or tones representing various directions and alerts, synchronized with the haptic cues. For example, a voice prompt might say, "Turn left in 50 meters," while a distinct sound could indicate the presence of a critical obstacle. The synchronization of haptic and sound feedback may provide a seamless and intuitive navigation experience. The system mat dynamically adjust the frequency, intensity, and combination of haptic vibrations and audio signals based on real-time changes in the running environment, ensuring the runner receives timely and relevant guidance. Moreover, the system may offer options for users to personalize feedback preferences based on their comfort, sensitivity, and individual needs. Accessibility features, such as compatibility with screen readers or support for multiple languages, contribute to making the navigation system inclusive for individuals with varying abilities.

In an embodiment of the haptic wheel navigation system, the process of mapping patterns involves correlating distinct haptic responses with varying degrees of deviation in orientation from a specified target. This mapping procedure is commonly established through a predefined set of rules or algorithms. This mapping may occur when the system first measures the angle or deviation of the user's orientation concerning the target, using sensors such as gyroscopes, accelerometers, and/or similar orientation sensors. Subsequently, a mapping algorithm interprets these angular measurements and translates them into corresponding haptic patterns. This algorithm defines the relationship between the measured angle and the parameters governing haptic feedback, including intensity, duration, and delay. Based on the mapped angular measurements, the system dynamically adjusts various parameters of the haptic feedback. These parameters encompass intensity, determining the strength of the haptic feedback based on the degree of deviation, duration specifying the time for each haptic pulse or vibration, delay indicating the interval between successive haptic pulses, and pulse width defining the shape or duration of each haptic pulse.

Users may customize these parameters through sliders or controls, enabling them to fine-tune intensity, delay, and pulse width in alignment with their preferences or specific requirements. Furthermore, the system continually generates real-time haptic feedback as the user's orientation changes concerning the target. This immediate feedback provides tactile cues, guiding the user toward the desired orientation or target. The mapping process involves interpreting angular measurements via algorithms to ascertain haptic feedback parameters. This enables the system to generate suitable tactile sensations corresponding to the user's orientation concerning the specified target.

Various algorithms can be employed within a haptic navigation system to enhance user interaction and aid navigation. These algorithms encompass Angular Mapping, which interprets orientation sensor data to create corresponding haptic patterns based on the user's orientation in relation to a target. Obstacle Detection algorithms identify obstacles, offering haptic guidance for circumnavigation. Pathfinding algorithms calculate optimal routes and provide directional cues through haptic feedback. Machine Learning or AI-based algorithms adapt feedback based on user behavior or environmental changes. Adaptive Control algorithms dynamically adjust parameters in real-time for consistent feedback. Tactile Pattern Recognition algorithms interpret received haptic patterns for meaningful cues, and Feedback Stability algorithms maintain the reliability and comfort of the haptic experience. Each algorithm contributes to improving the system's ability to provide informative and intuitive haptic guidance during navigation.

In the context of haptic navigation or haptic systems, "rendering" refers to the creation or generation of tactile or haptic feedback. This feedback is rendered in the form of physical sensations or vibrations that users perceive through touch. In the haptic navigation system, various elements might be rendered or generated to provide tactile cues to the user. For instance, the system could render vibrations, pulses, or patterns corresponding to different navigational instructions or environmental conditions. These rendered sensations are felt by the user, providing tactile guidance or information about their surroundings, directions, obstacles, or other relevant cues to aid in navigation or interaction with the system. Rendering involves the creation or generation of specific tactile sensations or patterns that users can feel and interpret through their sense of touch as part of the haptic feedback provided by the system.

The identification of the haptic line system's direction and/or orientation involves the use of computer vision through a camera combined with sensors, to ascertain the positioning and/or directional aspect of the users. This alignment with haptic technology aims to establish control over guiding individuals or enhancing haptic encounters. Integrating computer vision, AR, and VR settings, whether with or without geo/orientation sensors, allows for outputting sequential haptic cues. These cues serve the purpose of identifying and maintaining the user's intended path and/or offering supplementary navigational guidance.

In some aspects, the techniques described herein relate to a haptic navigation device configured to be communicatively coupled to a target including, but not limited to an object, a user, and/or an individual. The haptic navigation device may include: one or more sensors including at least an angular sensor, the angular sensor configured to detect angular data of an angle between an orientation of the haptic navigation device and the target; a vibration motor, the vibration motor configured to generate haptic feedback based on mapped patterns based on the orientation of the haptic navigation device relative to the target; a central processing unit (CPU) configured to: execute instructions to implement the haptic navigation device to interpret the angular data that is output from the angular sensor; translate the angular data to form a mapping of dynamic haptic patterns; and control the vibration motor of the haptic navigation device to correspond to the mapping of the dynamic haptic patterns; a memory, the memory to store the mapping of the dynamic haptic patterns; and a graphic user interface (GPI) configured to interact with the haptic feedback.

In some aspects, the techniques described herein relate to a haptic navigation device, wherein the memory is configured to store a predetermined haptic parameter values.

In some aspects, the techniques described herein relate to a haptic navigation device, wherein the angular data is mapped using one or more mapping algorithms.

In some aspects, the techniques described herein relate to a haptic navigation device, wherein the haptic feedback is a vibration output.

In some aspects, the techniques described herein relate to a haptic navigation device, wherein the vibration output is a frequency change.

In some aspects, the techniques described herein relate to a haptic navigation device, wherein the vibration output is an amplitude change.

In some aspects, the techniques described herein relate to a haptic navigation device, wherein the vibration output is intermittent.

In some aspects, the techniques described herein relate to a haptic navigation device, wherein the vibration output is continuous.

In some aspects, the techniques described herein relate to a haptic navigation device, wherein the vibration output has a range of about 0 Hz to about 1000 Hz.

In some aspects, the techniques described herein relate to a haptic navigation device, wherein the vibration output has a gradient transition from a substantially low intensity to a substantially to high according to the orientation determined by the angular data.

In some aspects, the techniques described herein relate to a haptic navigation device, further including: an adaptive control algorithm to dynamically adjust parameters in real-time.

In some aspects, the techniques described herein relate to a haptic navigation device, wherein the one or more sensors include at least one of geolocation, a gyroscope, and an accelerometer.

In some aspects, the techniques described herein relate to a method of implementing a haptic navigation device configured to be communicatively coupled to a target, including: providing the haptic navigation device; rendering a generation of haptic feedback to provide a cue to a user; and rendering a mapping pattern, using one or more algorithms, corresponding to a haptic response with varying degrees of deviation in orientation of the haptic navigation device implementing the haptic navigation device from the target, including: measuring angle measurements of the orientation of the haptic navigation device in relation to the target, using at least one sensor of a gyroscope and an accelerometer; interpreting, using one or more algorithms, the angle measurements; and translating the angle measurements, using the one or more algorithms, into corresponding the haptic feedback.

In some aspects, the techniques described herein relate to a method, wherein the haptic feedback is a vibration output.

In some aspects, the techniques described herein relate to a method, wherein the vibration output is a frequency change.

In some aspects, the techniques described herein relate to a method, wherein the vibration output is an amplitude change.

In some aspects, the techniques described herein relate to a method, wherein the vibration output is intermittent.

In some aspects, the techniques described herein relate to a method, wherein the vibration output is continuous.

In some aspects, the techniques described herein relate to a method, wherein the vibration output has a range of about 0 Hz to about 1000 Hz.

In some aspects, the techniques described herein relate to a method, further including: dynamically adjusting parameters in real-time using an adaptive control algorithm.

Computer System

Figure 35:
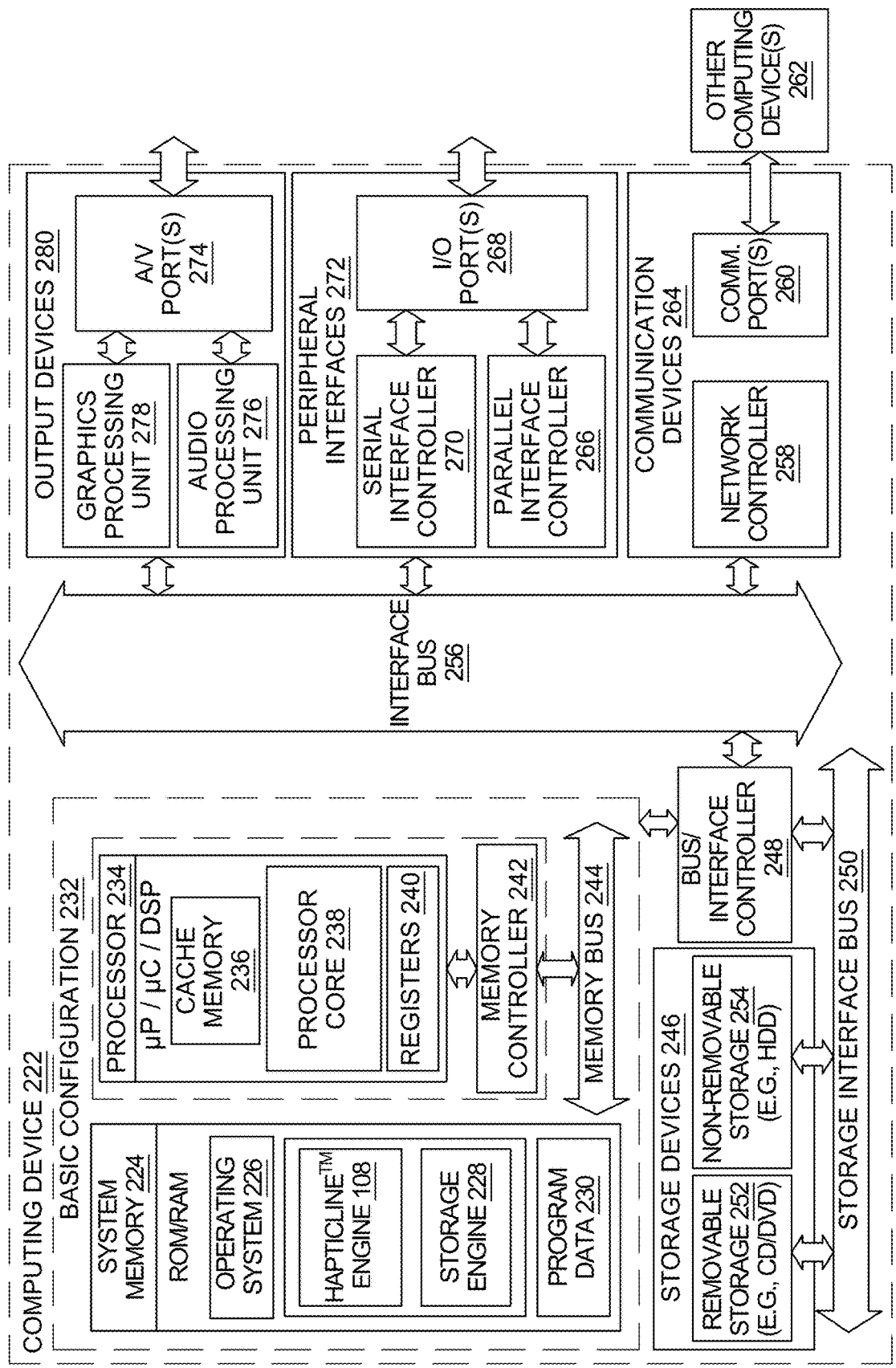
FIG. 35 depicts a block diagram of a computing device used within the system of FIG. 1, in accordance with embodiments of the present invention.

In some embodiments, the present invention may be a computer system, a method, and/or the computing device 116 (of FIG. 1) or the computing device 222 (of FIG. 35). For example, the computer system and/or the computing device 222 may be utilized to implement one or more methods described herein. A basic configuration 232 of a computing device 222 is illustrated in FIG. 35 by those components within the inner dashed line.

In the basic configuration 232 of the computing device 222 of FIG. 35, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (uP), a microcontroller (uC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the Haptic Line™ engine 108, and program data 230. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps described herein. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A haptic navigation device configured to be communicatively coupled to a target comprising:
   one or more sensors including at least an angular sensor, the angular sensor configured to detect angular data of an angle between an orientation of the haptic navigation device and the target;
   a vibration motor, the vibration motor configured to generate haptic feedback based on mapped patterns based on the orientation of the haptic navigation device relative to the target;
   a central processing unit (CPU) configured to:
      execute instructions to implement the haptic navigation device to interpret the angular data that is output from the angular sensor;
      translate the angular data to form a mapping of dynamic haptic patterns; and
      control the vibration motor of the haptic navigation device to correspond to the mapping of the dynamic haptic patterns;
   a memory, the memory to store the mapping of the dynamic haptic patterns; and
   a graphic user interface (GPI) configured to interact with the haptic feedback.

2. The haptic navigation device of claim 1, wherein the memory is configured to store a predetermined haptic parameter values.

3. The haptic navigation device of claim 1, wherein the angular data is mapped using one or more mapping algorithms.

4. The haptic navigation device of claim 1, wherein the haptic feedback is a vibration output.

5. The haptic navigation device of claim 4, wherein the vibration output is a frequency change.

6. The haptic navigation device of claim 4, wherein the vibration output is an amplitude change.

7. The haptic navigation device of claim 4, wherein the vibration output is intermittent.

8. The haptic navigation device of claim 4, wherein the vibration output is continuous.

9. The haptic navigation device of claim 4, wherein the vibration output has a range of about 0 Hz to about 1000 Hz.

10. The haptic navigation device of claim 4, wherein the vibration output has a gradient transition from a substantially low intensity to a substantially high intensity according to the orientation determined by the angular data.

11. The haptic navigation device of claim 4, further comprising:
    an adaptive control algorithm to dynamically adjust parameters in real-time.

12. The haptic navigation device of claim 1, wherein the one or more sensors include at least one of geolocation, a gyroscope, and an accelerometer.

13. A method of implementing a haptic navigation device configured to be communicatively coupled to a target, comprising:
    providing the haptic navigation device;
    rendering a generation of haptic feedback to provide a cue to a user; and
    rendering a mapping pattern, using one or more algorithms, corresponding to a haptic response with varying degrees of deviation in orientation of the haptic navigation device implementing the haptic navigation device from the target, comprising:
    measuring angle measurements of the orientation of the haptic navigation device in relation to the target, using at least one sensor of a gyroscope and an accelerometer;
    interpreting, using one or more algorithms, the angle measurements; and
    translating the angle measurements, using the one or more algorithms, into corresponding the haptic feedback.

14. The method of claim 13, wherein the haptic feedback is a vibration output.

15. The method of claim 14, wherein the vibration output is a frequency change.

16. The method of claim 14, wherein the vibration output is an amplitude change.

17. The method of claim 14, wherein the vibration output is intermittent.

18. The method of claim 14, wherein the vibration output is continuous.

19. The method of claim 14, wherein the vibration output has a range of about 0 Hz to about 1000 Hz.

20. The method of claim 14, further comprising:
    dynamically adjusting parameters in real-time using an adaptive control algorithm.

* * * * *